United States Patent
Inuta

(10) Patent No.: US 7,563,189 B2
(45) Date of Patent: Jul. 21, 2009

(54) CONTROL APPARATUS OF AUTOMATIC TRANSMISSION

(75) Inventor: Yukiyoshi Inuta, Kanagawa (JP)

(73) Assignee: JATCO Ltd, Fuji-shi (JP)

( * ) Notice: Subject to any disclaimer, the term of this patent is extended or adjusted under 35 U.S.C. 154(b) by 413 days.

(21) Appl. No.: 11/634,189

(22) Filed: Dec. 6, 2006

(65) Prior Publication Data

US 2007/0149351 A1      Jun. 28, 2007

(30) Foreign Application Priority Data

Dec. 26, 2005    (JP) ............................. 2005-372877

(51) Int. Cl.
*F16H 31/00*    (2006.01)

(52) U.S. Cl. ...................... 475/116; 475/127

(58) Field of Classification Search ................ 475/116, 475/118, 120, 121, 127, 128; 477/127, 128, 477/130, 143, 144, 149, 155, 70, 71, 68
See application file for complete search history.

(56) References Cited

U.S. PATENT DOCUMENTS

| | | | |
|---|---|---|---|
| 4,742,732 A | 5/1988 | Hiramatsu | |
| 5,961,421 A * | 10/1999 | Hoshiya et al. | 477/140 |
| 6,102,830 A * | 8/2000 | Tsutsui et al. | 477/143 |
| 6,270,444 B1 * | 8/2001 | Tsutsui et al. | 477/143 |
| 6,626,786 B2 * | 9/2003 | Hayabuchi et al. | 475/127 |
| 6,755,767 B2 * | 6/2004 | Hayabuchi et al. | 177/158 |

FOREIGN PATENT DOCUMENTS

| | | |
|---|---|---|
| JP | 62-46055 A | 2/1987 |
| JP | 2003-106439 | 4/2003 |
| WO | WO 95/12774 A1 | 5/1995 |

OTHER PUBLICATIONS

U.S. Appl. No. 11/529,572, filed Sep. 29, 2006, Inuta.

* cited by examiner

*Primary Examiner*—Roger L Pang
*Assistant Examiner*—Justin Holmes
(74) *Attorney, Agent, or Firm*—Foley & Lardner LLP

(57) ABSTRACT

A control apparatus of an automatic transmission includes first, second and third frictional elements, first and second shift control sections issuing a hydraulic pressure command to the first, second and third frictional elements for appointment and release thereof at primary and secondary shifts, a judging section judging a shift from a first speed stage to a third speed stage, and a third shift control section initiating the primary shift when the shift is judged, and initiating the secondary shift before an end of the primary shift while executing the primary shift when a gear ratio reaches a first predetermined gear ratio. the third shift control section compares two pressure command values of the first frictional element, respectively issued by the first and second shift control sections for the primary and secondary shifts, and selects a greater pressure command value, and outputs it to the first frictional element.

12 Claims, 15 Drawing Sheets

FIG.2

|      | LOW/C | 3-5R/C | H/C | L&R/B | 2-6/B | LOW/OWC |
|------|-------|--------|-----|-------|-------|---------|
| 1ST  | ○ |   |   | ⊗ |   | ◉ |
| 2ND  | ○ |   |   |   | ○ |   |
| 3RD  | ○ | ○ |   |   |   |   |
| 4TH  | ○ |   | ○ |   |   |   |
| 5TH  |   | ○ | ○ |   |   |   |
| 6TH  |   |   | ○ |   | ○ |   |
| REV  |   | ○ |   | ○ |   |   |

⊗: ENGINE BRAKE

NORMAL DOWNSHIFT LOGIC (n-SPEED → (n-1) SPEED)

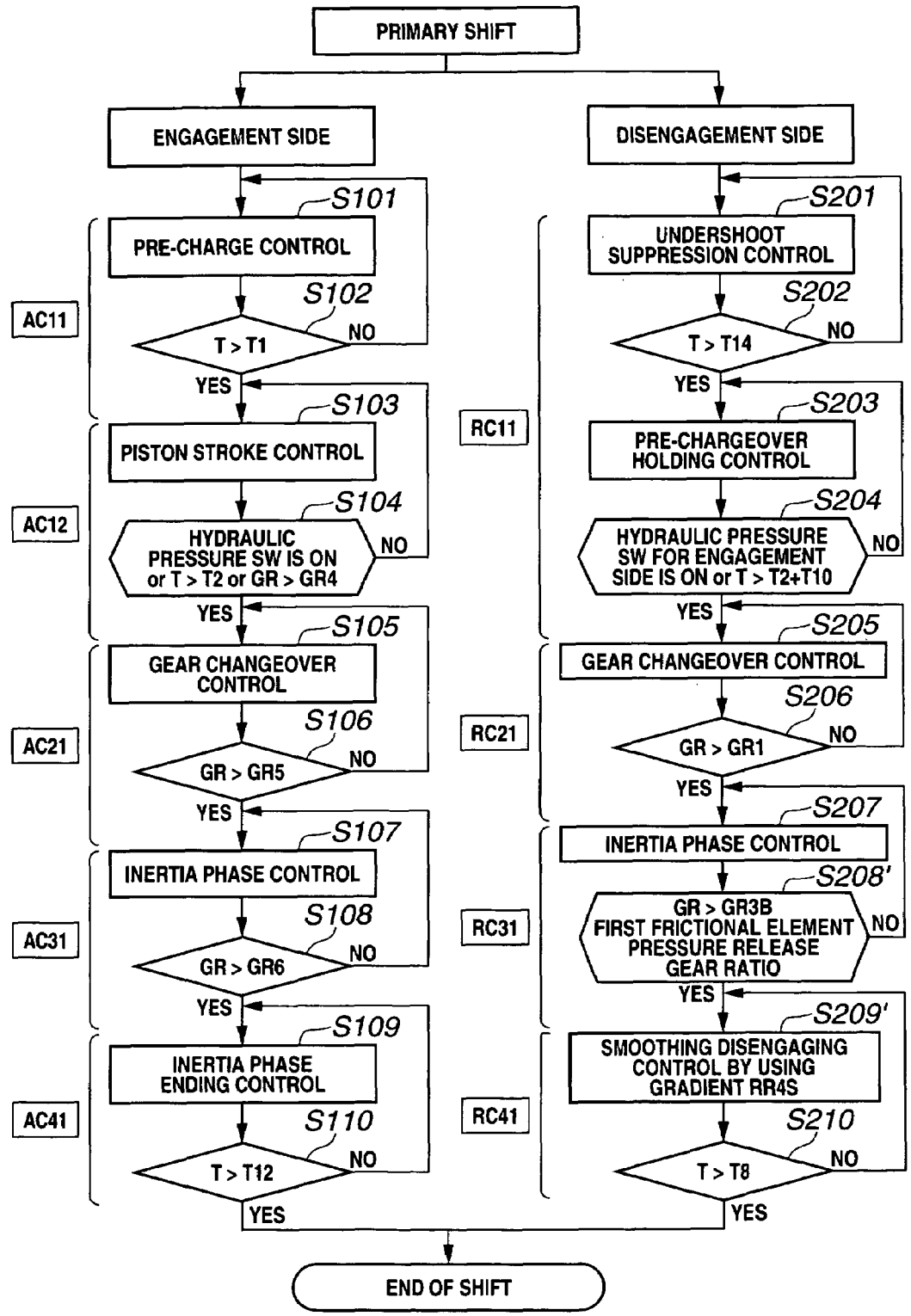

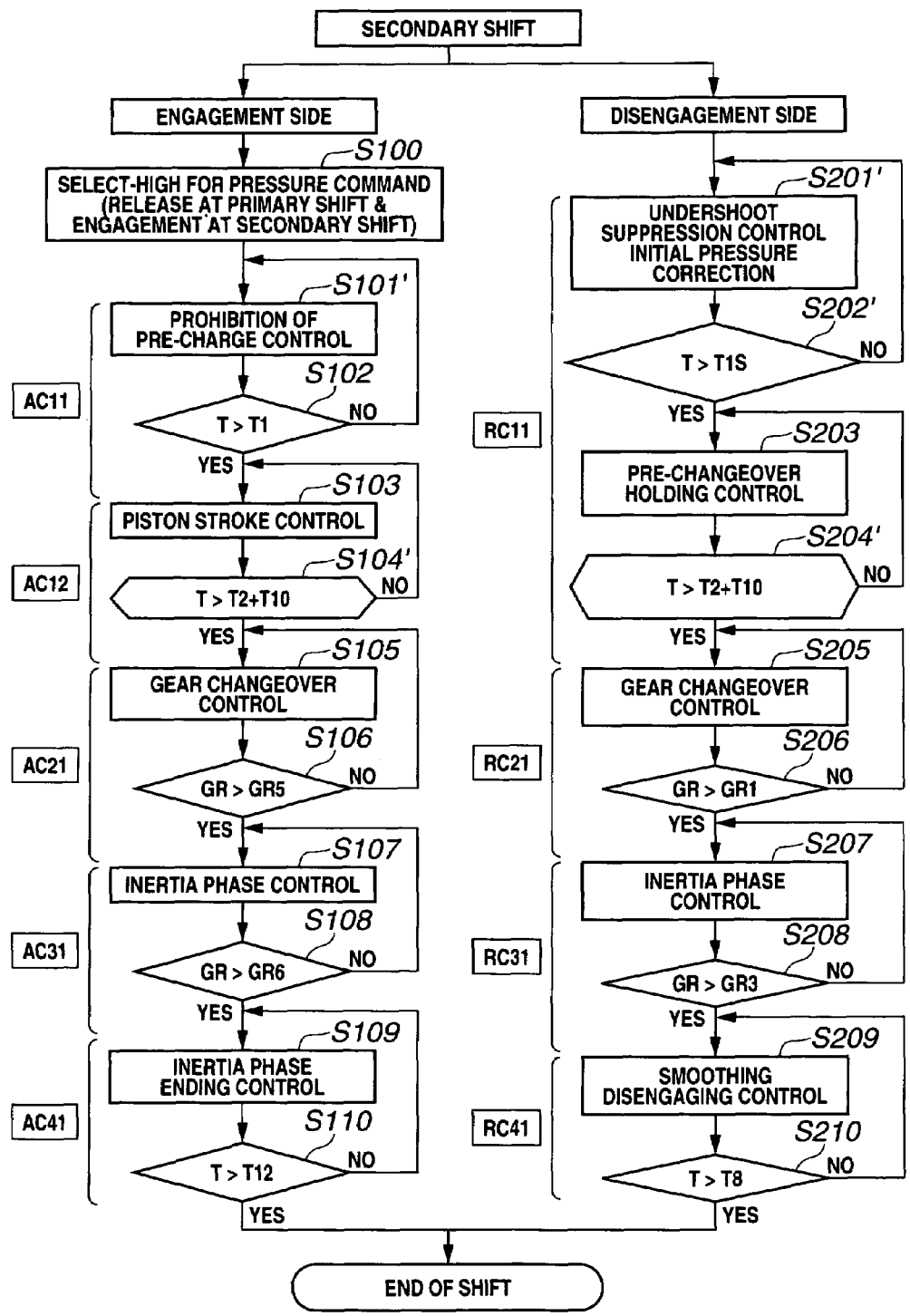

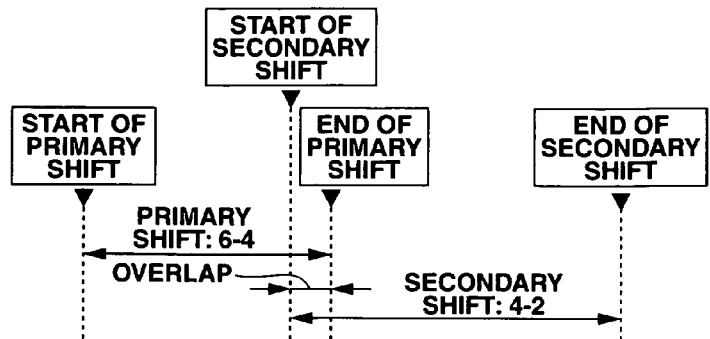
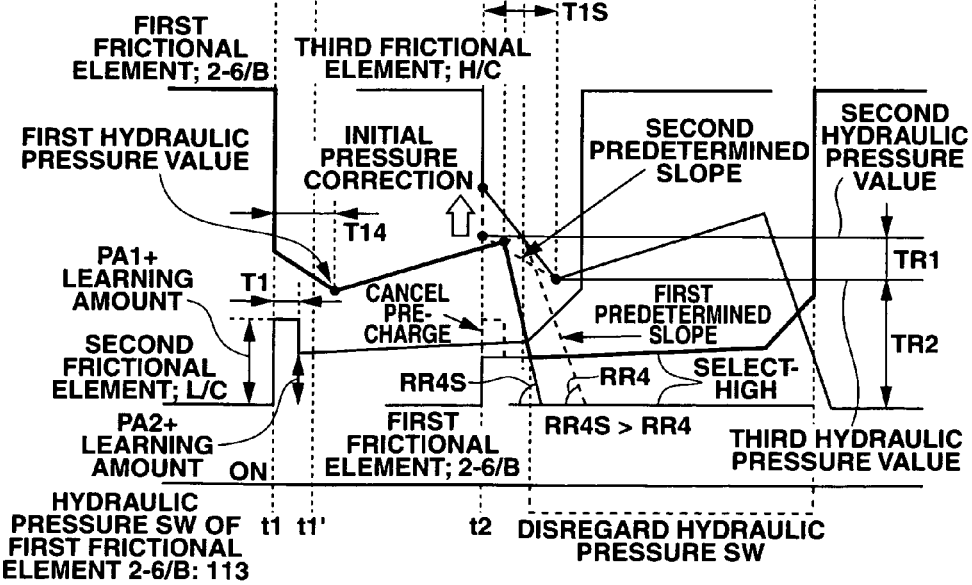

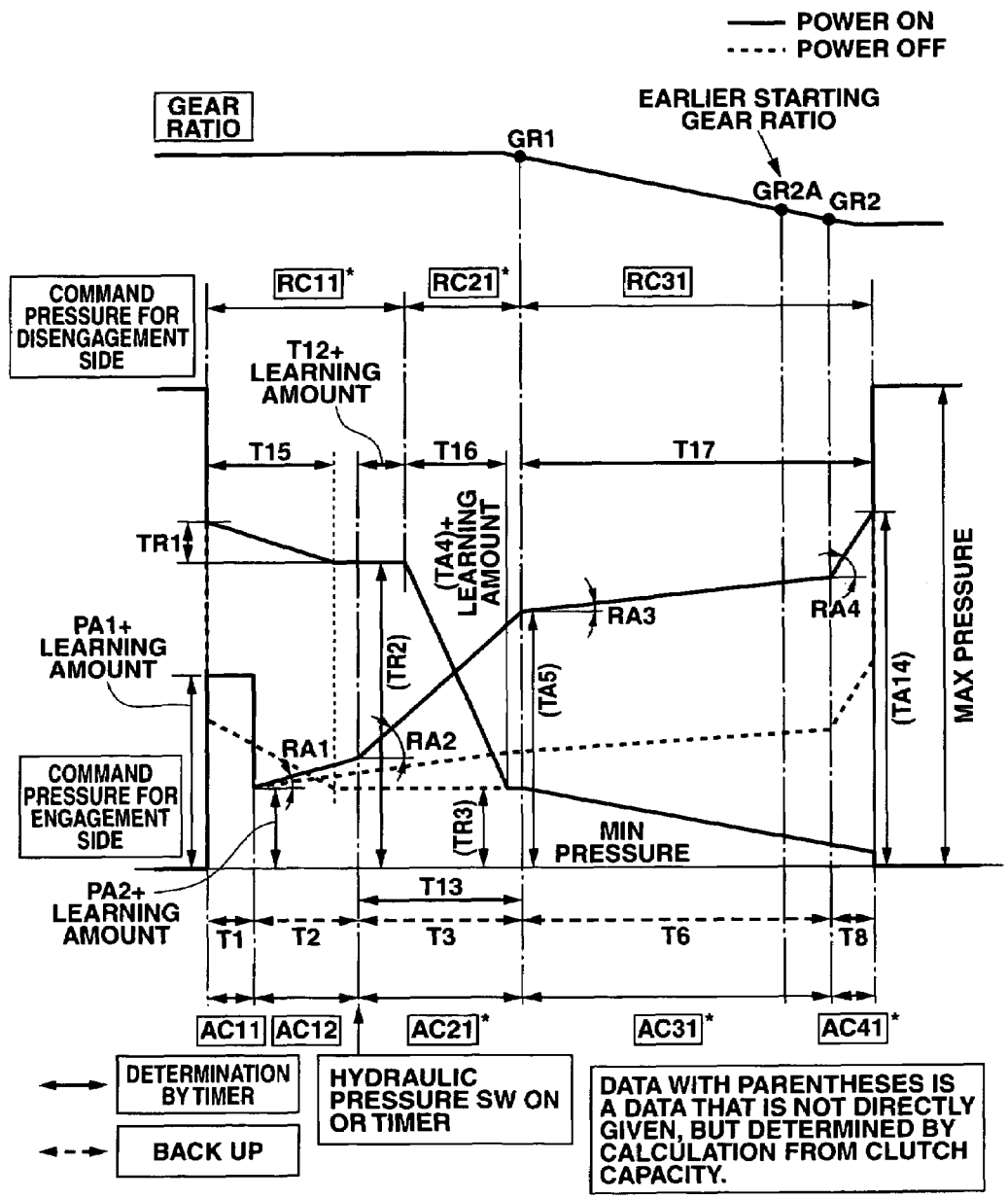

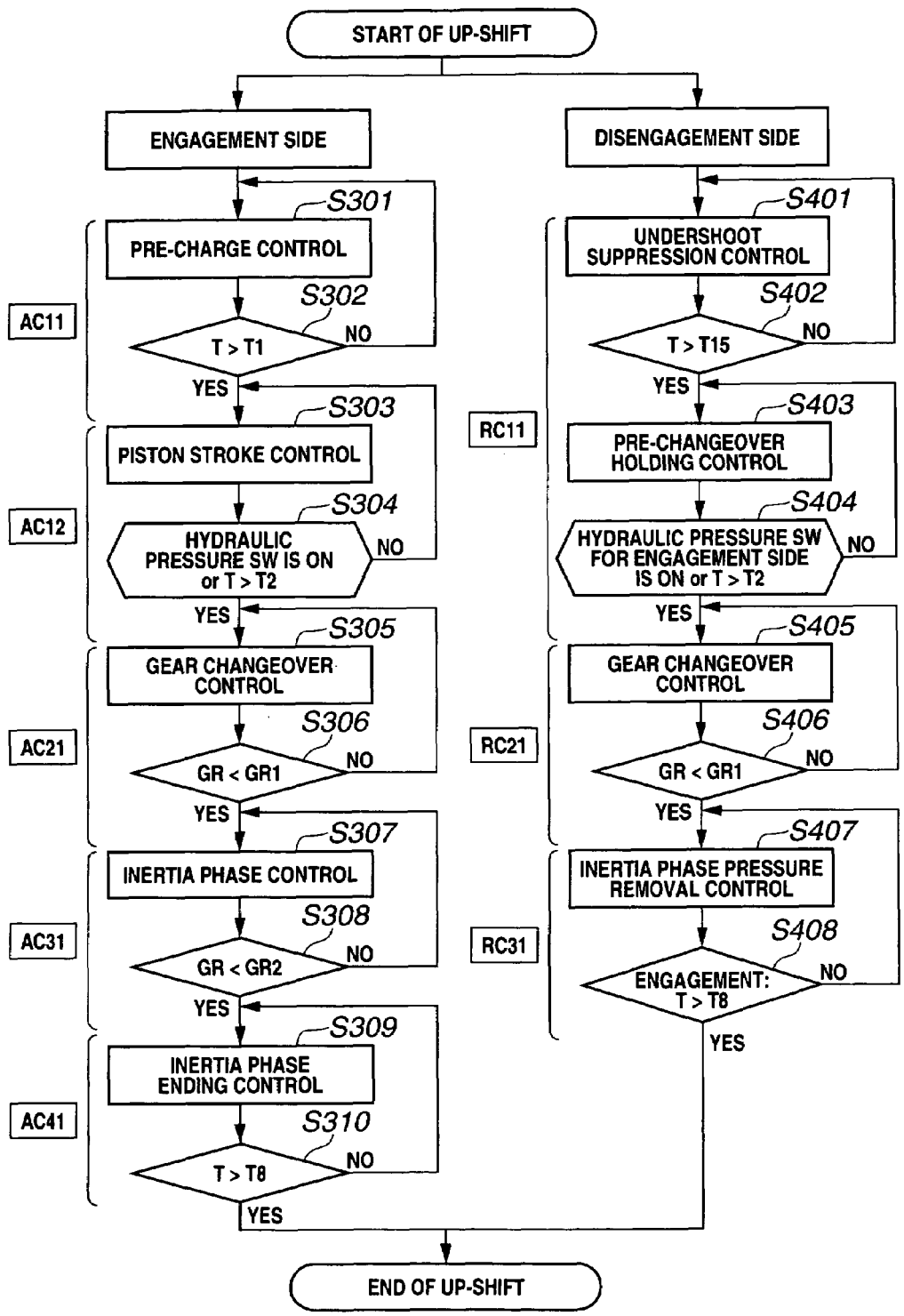

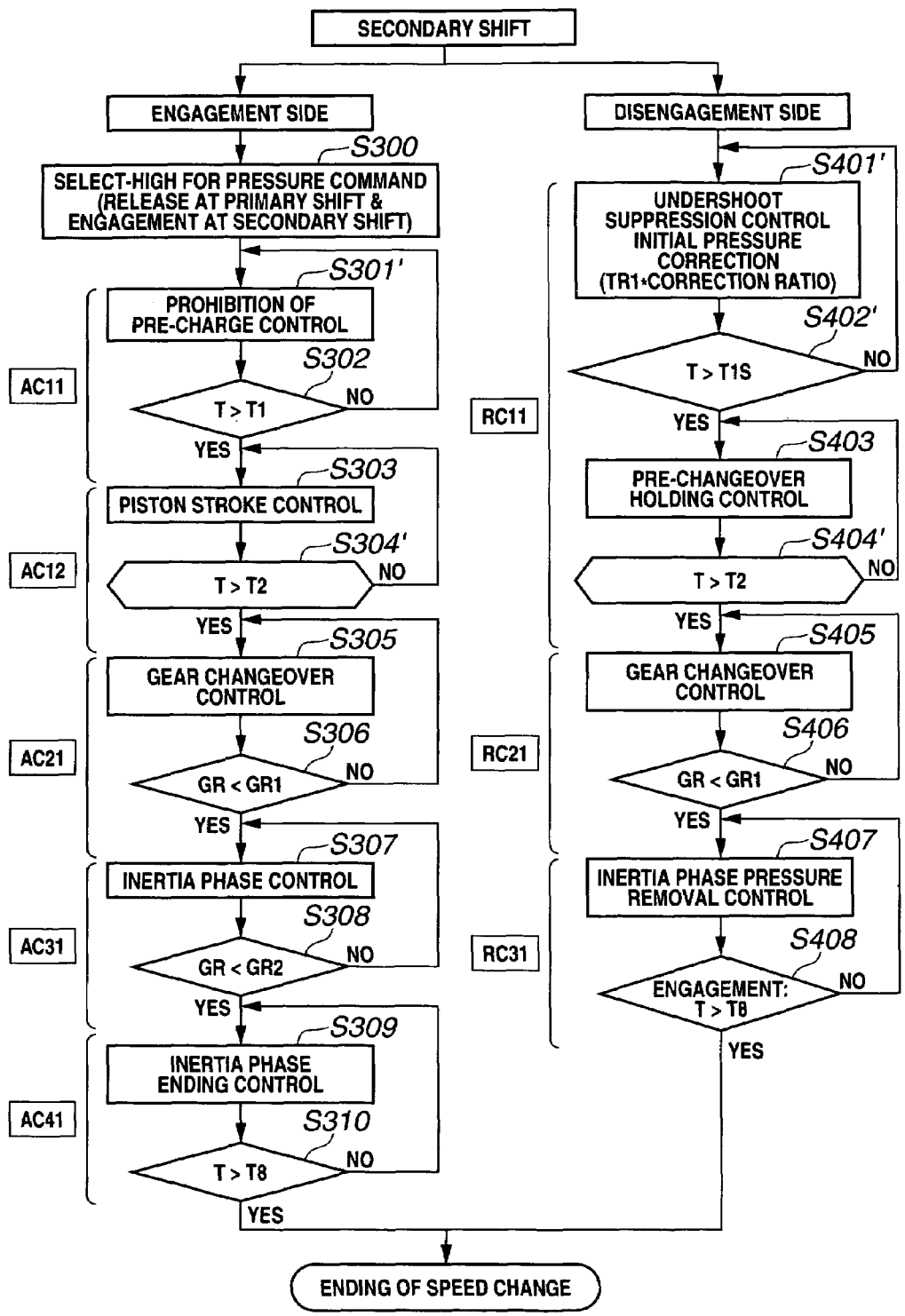

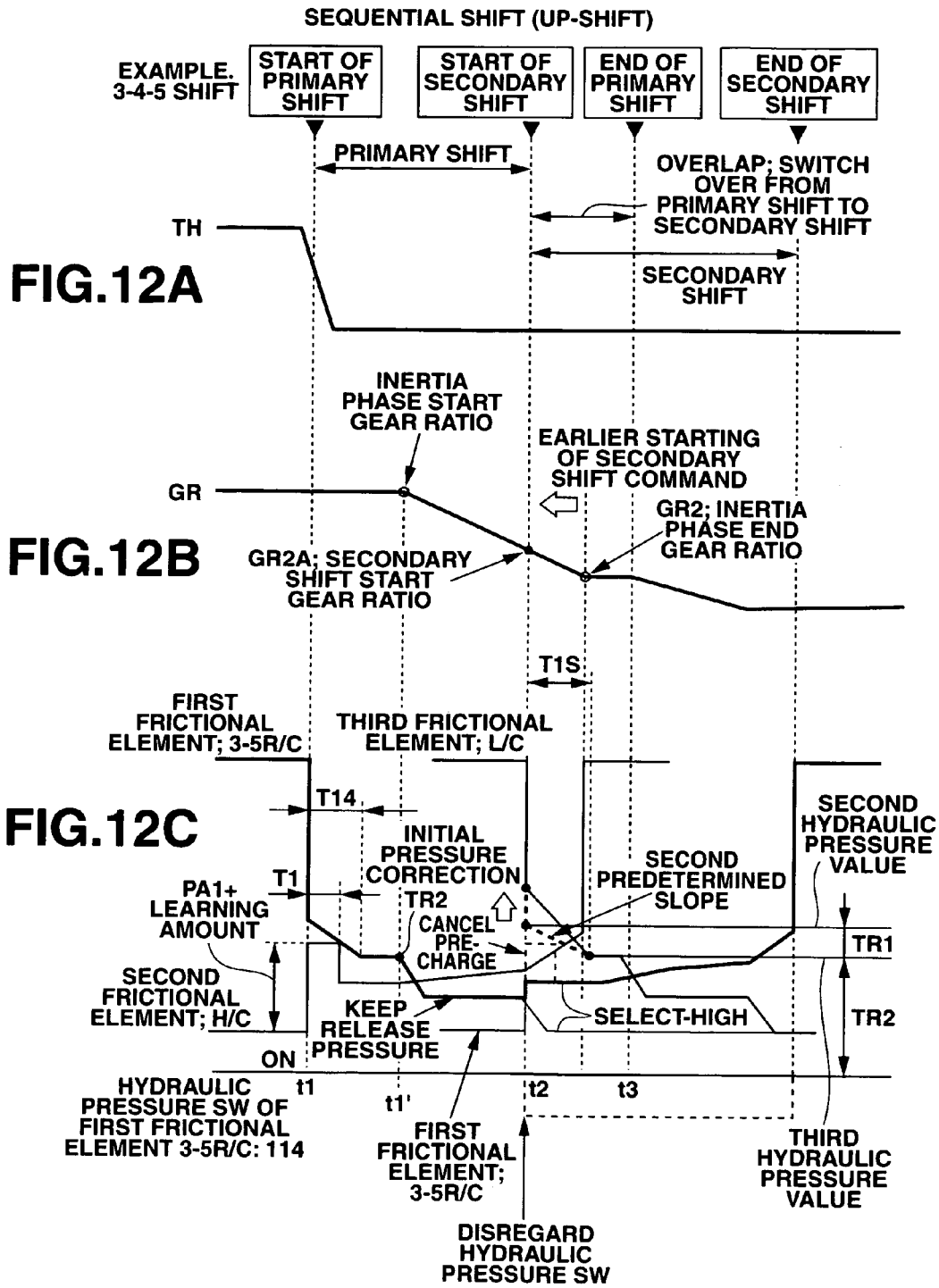

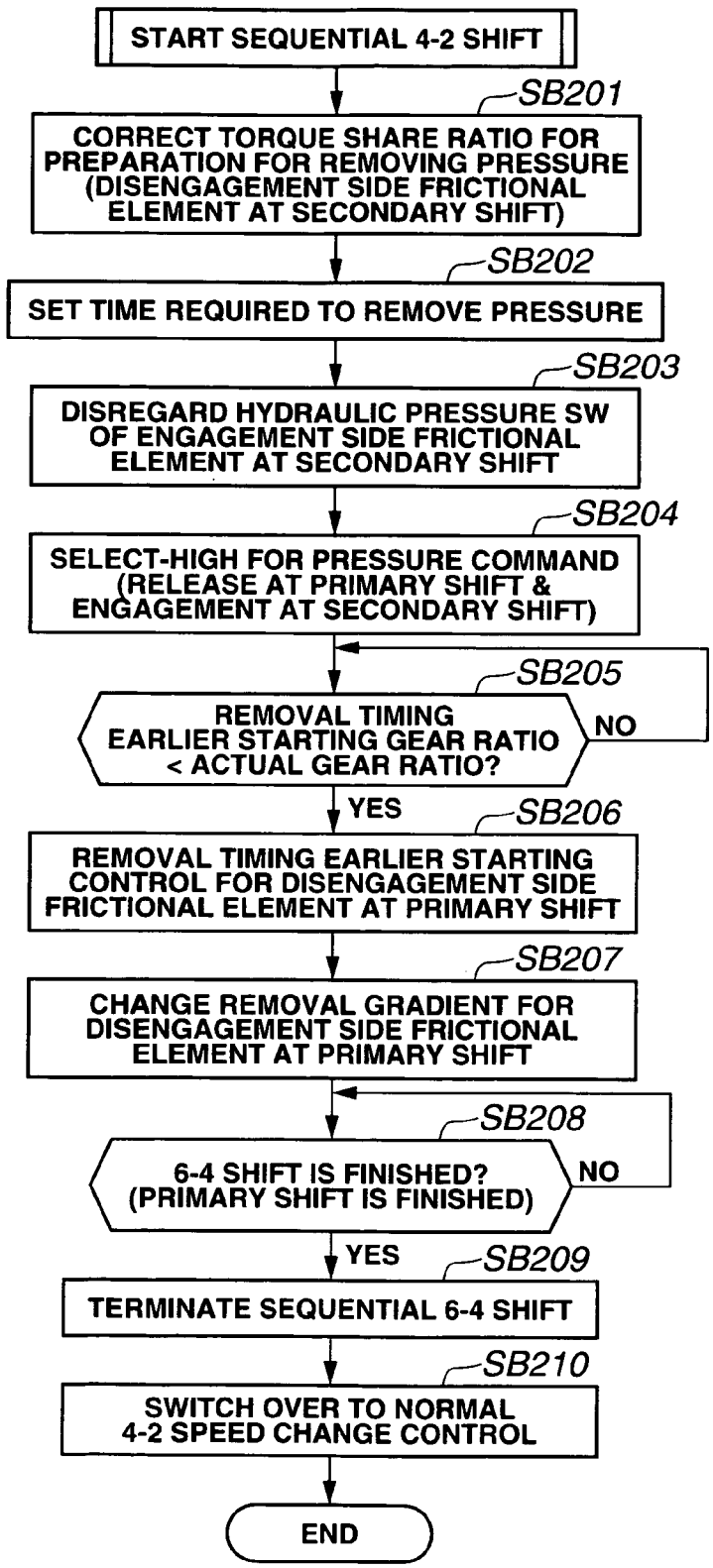

CONTROL APPARATUS OF AUTOMATIC TRANSMISSION

BACKGROUND OF THE INVENTION

The present invention relates to a control apparatus of an automatic transmission mounted on a vehicle, and more particularly to a control apparatus for a multispeed automatic transmission that has five or over five speeds.

In recent years, the number of speeds of automatic transmissions has increased, and also the number of frictional elements such as clutches and brakes has increased with the increase of the number of speeds. Further, a spacing or interval between speed change lines (or shift lines) in a shift map becomes much denser with such increase of the number of speeds. For this reason, speed change easily takes place even according to a small change of operation condition of the vehicle (for instance, a change of throttle opening). Thus, when the interval of shift lines in the shift map becomes denser in this way, so-called two skip shift (for example, shift from $6^{th}$ speed to $3^{rd}$ speed) or three skip shift (for example, shift from $6^{th}$ speed to $2^{nd}$ speed) tends to occur frequently.

In addition, in the automatic transmission in these days, a gate type speed change lever is installed to enable an easy and positive shift operation for a driver, or a speed change paddle or button are arranged around a steering wheel. Thus, in such automatic transmissions, the two or three skip shift could be performed much frequently by the shift operation of the driver. With respect to such skip shift, especially one skip shift in a downshift direction (for instance, shift from $4^{th}$ speed to $2^{nd}$ speed), usually, its programs for optimum speed change control are pre-installed and its data for the control of one skip shift is stored. Then, for example, in the case of one skip downshift as the above shift from $4^{th}$ speed to $2^{nd}$ speed, it is performed by and according to the optimum speed change control program.

Further, in a case of the multispeed automatic transmission as well, it could be possible to pre-install the optimum programs for each speed change pattern of the skip shift, such as the two or three skip shift etc. However, in that case, it could lead to an extreme increase of the data amount, which is stored in a control unit for the transmission, and then result in an extreme increase in storage capacity of memory.

Here, in the following, among such skip shifts, a shift for which the speed change control program is not installed is termed "a sequential shift".

For the above drawbacks, in Japanese Patent Provisional Publication (Tokkaisho) No. 62-46055 (hereinafter is referred to as "JP62-46055"), at the time of the sequential shift, the speed change is sequentially carried out (for instance, in a case of shift from $5^{th}$ speed to $2^{nd}$ speed, one skip shift from $5^{th}$ speed to $3^{rd}$ speed is first carried out and then shift from $3^{rd}$ speed to $2^{nd}$ speed is carried out). On the other hand, in International Publication No. 95/12774 (WO95/12774), upon judging a shift from a higher speed to a lower speed, the shift is carried out through an intermediate speed. And when the shift from the intermediate speed to the lower speed is carried out, this shift is accelerated (or this shift is advanced).

SUMMARY OF THE INVENTION

In JP62-46055, however, the speed change is carried out from a current speed to a target speed by mere plural sequential shifts. In this case, the greater the difference between the current speed and the target speed (desired or final speed), the more the number of shift increases. Thus, this causes the occurrence of shift shock and the increase of time required to reach the target speed, and drivability therefore deteriorates. Further, in this JP62-46055, the speed change is made in a short time by usage of higher hydraulic pressure than normal hydraulic pressure in hydraulic pressure control. However, assuming that the normal hydraulic pressure is set to such an optimum pressure that the shift shock does not occur, in the case where the hydraulic pressure is increased, there arises a problem that the shift shock deteriorates or this aggravates the shift shock.

On the other hand, in the case where the speed change is carried out from the current speed to the target speed by plural sequential shifts (or by plural number of the sequential shifts), as disclosed in International Publication No. 95/12774, it could be possible to reduce the shift time (namely the time required to reach the target speed) by initiating the following or subsequent shift when synchronized rotation has been attained. However, in the case of the multispeed automatic transmission, the speed change might be made such that a state of the frictional element changes from a disengaged state to an engaged state during an initial shift (a first or primary shift) and then changes from the engaged state to the disengaged state during next shift (a second or secondary shift). Nevertheless, a proper way of such speed change (or speed change pattern or shift pattern) has not been taken account of in detail. Because of this, in the above particular shift pattern, in the case of the shift from the primary shift to the secondary shift, if speed change control is executed without considering the engagement state of the frictional element, there is a possibility that a considerable shift shock will occur.

It is therefore an object of the present invention to provide an automatic transmission which completes the shift speedily at the sequential shift while minimizing the increase of the data even the multispeed automatic transmission, and suppresses the deterioration in the drivability and the occurrence of shift shock.

According to one aspect of the present invention, a control apparatus of an automatic transmission comprises: a first frictional element that is engaged at a first speed stage and is released at a second speed stage achieved by a primary shift and further is engaged at a third speed stage achieved by a secondary shift; a second frictional element that is released at the first speed stage and is engaged at the second speed stage and further is engaged at the third speed stage; a third frictional element that is engaged at the first speed stage and is engaged at the second speed stage and further is released at the third speed stage; a first shift control section that issues a command of hydraulic pressure for the first frictional element to be released, and issues a command of hydraulic pressure for the second frictional element to be engaged, at the time of the primary shift; a second shift control section that issues a command of hydraulic pressure for the first frictional element to be engaged, and issues a command of hydraulic pressure for the third frictional element to be released, at the time of the secondary shift; a judging section that judges a shift from the first speed stage to the third speed stage based on an operation condition of a vehicle; and a third shift control section that initiates the primary shift when the shift is judged by the judging section, and initiates the secondary shift while carrying out the primary shift when a gear ratio reaches a first predetermined gear ratio set before a gear ratio where an inertia phase of the primary shift is ended, or when a parameter reaches a parameter corresponding to the first predetermined gear ratio, and the third shift control section compares two pressure command values for the first frictional element, respectively issued by the first and second shift control sections, and selects a greater pressure command value, and outputs the greater pressure command value to the first frictional element, upon the initiation of the secondary shift.

According to another aspect of the invention, a control apparatus of an automatic transmission comprises: a first frictional element that is engaged at a first speed stage and is released at a second speed stage achieved by a primary shift and further is engaged at a third speed stage achieved by a secondary shift; a second frictional element that is released at the first speed stage and is engaged at the second speed stage and further is engaged at the third speed stage; a third frictional element that is engaged at the first speed stage and is engaged at the second speed stage and further is released at the third speed stage; the first, second and third frictional elements are configured to respectively receive a pressure command value and to be engaged by a high pressure command value and to be released by a low pressure command value; a shift control section that outputs the pressure command value to the first, second and third frictional elements for engagement and release thereof, and upon judging a shift from the first speed stage to the third speed stage based on an operation condition of a vehicle, initiates the secondary shift before the primary shift is finished; and the shift control section compares two pressure command values of the first frictional element for the primary shift and for the secondary shift, and selects a greater pressure command value, and outputs the greater pressure command value to the first frictional element, upon the initiation of the secondary shift before the end of the primary shift.

According to a further aspect of the invention, A control apparatus of an automatic transmission comprises: a first frictional element that is engaged at a first speed stage and is released at a second speed stage achieved by a primary shift and further is engaged at a third speed stage achieved by a secondary shift; a second frictional element that is released at the first speed stage and is engaged at the second speed stage and further is engaged at the third speed stage; a third frictional element that is engaged at the first speed stage and is engaged at the second speed stage and further is released at the third speed stage; first control means for issuing a command of hydraulic pressure for the first frictional element to be released, and issuing a command of hydraulic pressure for the second frictional element to be engaged, at the time of the primary shift; second control means for issuing a command of hydraulic pressure for the first frictional element to be engaged, and issuing a command of hydraulic pressure for the third frictional element to be released, at the time of the secondary shift; judging means for judging a shift from the first speed stage to the third speed stage based on an operation condition of a vehicle; and third control means for initiating the primary shift when the shift is judged by the judging means, and initiating the secondary shift while carrying out the primary shift when a gear ratio reaches a first predetermined gear ratio set before a gear ratio where an inertia phase of the primary shift is ended or when a parameter reaches a parameter corresponding to the first predetermined gear ratio, and the third control means compares two pressure command values for the first frictional element, respectively issued by the first and second control means, and selects a greater pressure command value, and outputs the greater pressure command value to the first frictional element, upon the initiation of the secondary shift.

According to a still further aspect of the invention, a method for controlling hydraulic pressure for a computer-controlled automatic transmission having a first frictional element that is engaged at a first speed stage and released at a second speed stage achieved by a primary shift and further engaged at a third speed stage achieved by a secondary shift, a second frictional element that is released at the first speed stage and engaged at the second speed stage and further engaged at the third speed stage, and a third frictional element that is engaged at the first speed stage and engaged at the second speed stage and further released at the third speed stage, wherein a shift control section is provided for outputting each pressure command value to the first, second and third frictional elements for engagement and release thereof, and initiating the primary and secondary shifts at their respective proper timings, the method comprises: upon the initiation of the secondary shift before an end of the primary shift by the shift control section, comparing two pressure command values of the first frictional element for the primary shift and for the secondary shift; selecting a greater pressure command value; and outputting the greater pressure command value to the first frictional element.

The other objects and features of this invention will become understood from the following description with reference to the accompanying drawings.

BRIEF DESCRIPTION OF THE DRAWINGS

FIG. 2 is a table showing an engagement state of each frictional element for each speed in a control apparatus for the automatic transmission according to an embodiment.

FIGS. 7A, 7B are flow charts for explanation of operation steps, some of which differ from the operation steps at the normal downshift in the control apparatus.

FIG. 8 is a time chart showing characteristics at a downshift of $6^{th} \rightarrow 4^{th} \rightarrow 2^{nd}$ speed. FIG. 8A indicates a throttle opening TH. FIG. 8B indicates gear ratio (or transmission ratio) GR of the automatic transmission. FIG. 8C indicates hydraulic pressure command values for the frictional elements that are engaged or disengaged at the speed change (or at the shift).

FIG. 9 is a time chart showing characteristics at a normal up-shift in the control apparatus for the automatic transmission.

FIG. 10 is a flow chart for explanation of operation steps at the normal up-shift in the control apparatus for the automatic transmission.

FIG. 11 is flow a chart for explanation of operation steps, some of which differ from the operation steps at the normal up-shift in the control apparatus.

FIG. 12 is a time chart showing characteristics at an up-shift of $3^{rd} \rightarrow 4^{th} \rightarrow 5^{th}$ speed. FIG. 12A indicates a throttle opening TH. FIG. 12B indicates gear ratio (or transmission ratio) GR of the automatic transmission. FIG. 12C indicates hydraulic pressure command value for the frictional elements that is engaged or disengaged at the speed change (or at the shift).

FIG. 14 is an example of flow chart for explanation of operation steps, which shows a subroutine in FIG. 13.

DETAILED DESCRIPTION OF THE INVENTION

A control apparatus of an automatic transmission of the present invention will be explained below with reference to the drawings.

1. Configuration of The Automatic Transmission

Figure 1:
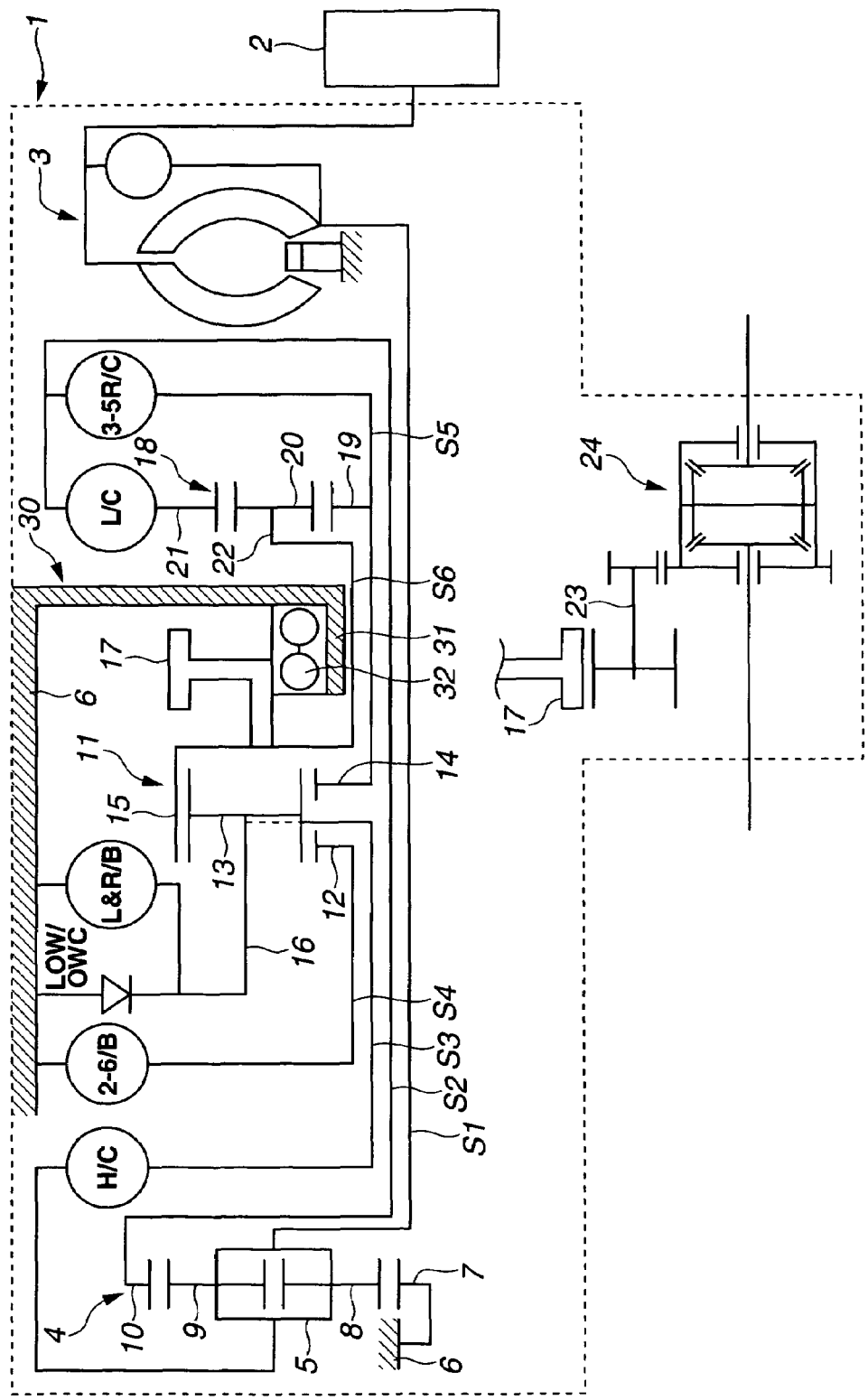
FIG. 1 is a schematic view of a six forward speed and one reverse speed automatic transmission to which the present invention is applied.

FIG. 1 is a schematic view of a six forward speed and one reverse speed automatic transmission 1 to which the present invention is applied. As seen in FIG. 1, an engine power from an engine 2 is input to a torque converter 3, and further input to a carrier 5 of a double pinion type planetary gear unit (a first planetary gear unit) 4 through a first rotation shaft S1.

Double pinion type planetary gear unit 4 has a sun gear 7 secured to a transmission case 6, inside pinion gears 8 meshed with sun gear 7, outside pinion gears 9 meshed with inside pinion gears 8, a ring gear 10 that is meshed with outside pinion gears 9 and is coaxially aligned with sun gear 7, and the above-mentioned carrier 5 that rotatably supports inside and outside pinion gears 8 and 9.

Ring gear 10 is connected to a second rotation shaft S2 that covers an outer periphery of first rotation shaft S1 and extends toward engine 2 through the inside of an after-mentioned output gear 17. As for the carrier 5, it is connected through a high clutch H/C to one end of a third rotation shaft S3 that covers an outer periphery of second rotation shaft S2 and extends toward engine 2. The other end of third rotation shaft S3, which is opposite to the one end connected to the high clutch H/C, is connected to a carrier 16 that supports pinion gears 13 of a single pinion type planetary gear unit (a second planetary gear unit) 11. Carrier 16 is connected to transmission case 6 through a low and reverse brake L&R/B and a low one way clutch LOW/OWC, which are arranged parallel to each other.

By this arrangement, carrier 16 is rotatably supported in one rotation direction by transmission case 6, and the rotation in one direction of transmission case 6 can be selectively inhibited (restrained or locked) or permitted (released). Single pinion type planetary gear unit 11 has pinion gears 13, a second sun gear 14 arranged at the side of engine 2 and meshed with pinion gears 13, a first sun gear 12 arranged at a side opposite to engine 2 and meshed with pinion gears 13, and a ring gear 15 meshed with pinion gears 13.

First sun gear 12 is connected to a fourth rotation shaft S4 that extends in a direction opposite to engine 2 and covers an outer periphery of third rotation shaft S3. Fourth rotation shaft S4 is connected to transmission case 6 through a 2-6 brake 2-6/B. By this connection, fourth rotation shaft S4 can be fixed or released with respect to transmission case 6 through the 2-6 brake 2-6/B. As for the second sun gear 14, it is connected to a fifth rotation shaft S5 that extends toward engine 2 through the inside of output gear 17 and covers the outer periphery of second rotation shaft S2. Fifth rotation shaft S5 is connected to second rotation shaft S2 through a 3-5 reverse clutch 3-5R/C, and also connected to a ring gear 21 of a single pinion type planetary gear unit (a third planetary gear unit) 18 through a low clutch LOW/C.

With respect to the single pinion type planetary gear unit 18, it is arranged at an outer periphery side of fifth rotation shaft S5 between output gear 17 and the 3-5 reverse clutch 3-5R/C. In more detail, single pinion type planetary gear unit 18 has a sun gear 19 connected to fifth rotation shaft S5, the ring gear 21 arranged at an outside of sun gear 19, pinion gears 20 meshed with sun gear 19 and ring gear 21, and a carrier 22 supports pinion gears 20.

Carrier 22 is connected to a sixth rotation shaft S6 that covers an outer periphery side of fifth rotation shaft S5 and extends toward single pinion type planetary gear unit (the second planetary gear unit) 11 through the inside of output gear 17. And sixth rotation shaft S6 is connected to ring gear 15 of single pinion type planetary gear unit (the second planetary gear unit) 11.

Between second planetary gear unit 11 and third planetary gear unit 18, a bearing support portion 30 is disposed. This bearing support portion 30 is integrally formed with transmission case 6 through a wall member, and has a cylindrical bearing support portion 31 that extends along sixth rotation shaft S6. In addition, a bearing 32 is fit into cylindrical bearing support portion 31. And then, output gear 17 connected to ring gear 15 contacts or abuts on an outer periphery (an outer race) of bearing 32. The above-mentioned first, second, fifth and sixth rotation shafts S1, S2, S5 and S6 are coaxially aligned with each other inside cylindrical bearing support portion 31.

Then, in automatic transmission 1, an automatic speed change (or automatic shift) control of the six forward speed is carried out at D-range position on the basis of both an operating point that is determined by a vehicle speed and a throttle opening and a speed change schedule (a shift map). While, a speed change control of one reverse speed is carried out by selecting or changing operation from D-range position to R-range position.

In the above automatic speed change control, by a combination of engagement and disengagement between the high clutch H/C, the 2-6 brake 2-6/B, the low and reverse brake L&R/B, the low clutch LOW/C, and the 3-5 reverse clutch 3-5R/C, an output rpm of the engine power from engine 2 is converted to a desired or target rpm. And then, the engine power is transmitted from output gear 17 to road wheels (not shown) via a countershaft 23 and a differential gear 24.

Next, FIG. 2 shows a table that indicates an engagement state or condition of each frictional element for each speed in this speed change (or shift) control. In the table, "◯" indicates engagement (engaged state), "no sign" indicates disengagement (released or disengaged state), "⊗" indicates engagement (engaged state) that is effective at only engine brake, and "☉" indicates that the low one way clutch LOW/OWC is mechanically engaged (restrains rotation) when the engine is driven. As shown in the table, $1^{st}$ speed is achieved by the engagement of low clutch LOW/C and the engagement of low and reverse brake L&R/B. In this case, a rotation that is reduced in speed by passing through the input shaft (the first rotation shaft S1) and first planetary gear unit 4 is input to carrier 22 through second rotation shaft S2 and the low clutch LOW/C and also ring gear 21 of third planetary gear unit 18. Further, the rotation is transmitted to ring gear 15 of second planetary gear unit 11, and ring gear 15 rotates at a reduced speed while receiving a counterforce by carrier 16 that is fixed to transmission case 6 by the engagement of low one way clutch LOW/OWC. And then, the reduced rotation is output from output gear 17 as a maximum reduction gear ratio (or maximum reduction transmission ratio). Here, at the engine brake, the low and reverse brake L&R/B receives the counterforce in place of the low one way clutch LOW/OWC that is idling.

$2^{nd}$ speed is achieved by the engagement of low clutch LOW/C and the engagement of 2-6 brake 2-6/B. In this $2^{nd}$ speed, by the engagement of 2-6 brake 2-6/B, first sun gear 12 and pinion gears 13 are fixed with respect to transmission case 6. Further, since pinion gears 13 is meshed with second sun gear 14, fifth rotation shaft S5 connected to second sun gear 14 becomes fixed with respect to transmission case 6.

$3^{rd}$ speed is achieved by the engagement of low clutch LOW/C and the engagement of 3-5 reverse clutch 3-5R/C. Further, $4^{th}$ speed is achieved by the engagement of low clutch LOW/C and the engagement of high clutch H/C. $5^{th}$ speed is achieved by the engagement of 3-5 reverse clutch 3-5R/C and the engagement of high clutch H/C. $6^{th}$ speed is achieved by the engagement of high clutch H/C and the engagement of 2-6 brake 2-6/B. Here, in this $6^{th}$ speed, in the same manner as the $2^{nd}$ speed, by the engagement of 2-6 brake 2-6/B, fifth rotation shaft S5 becomes fixed. On the other hand, reverse is achieved by the engagement of 3-5 reverse clutch 3-5R/C and the engagement of low and reverse brake L&R/B.

2. Explanation of Hydraulic Circuit and Electronic Speed Change Control Unit

Figure 3:
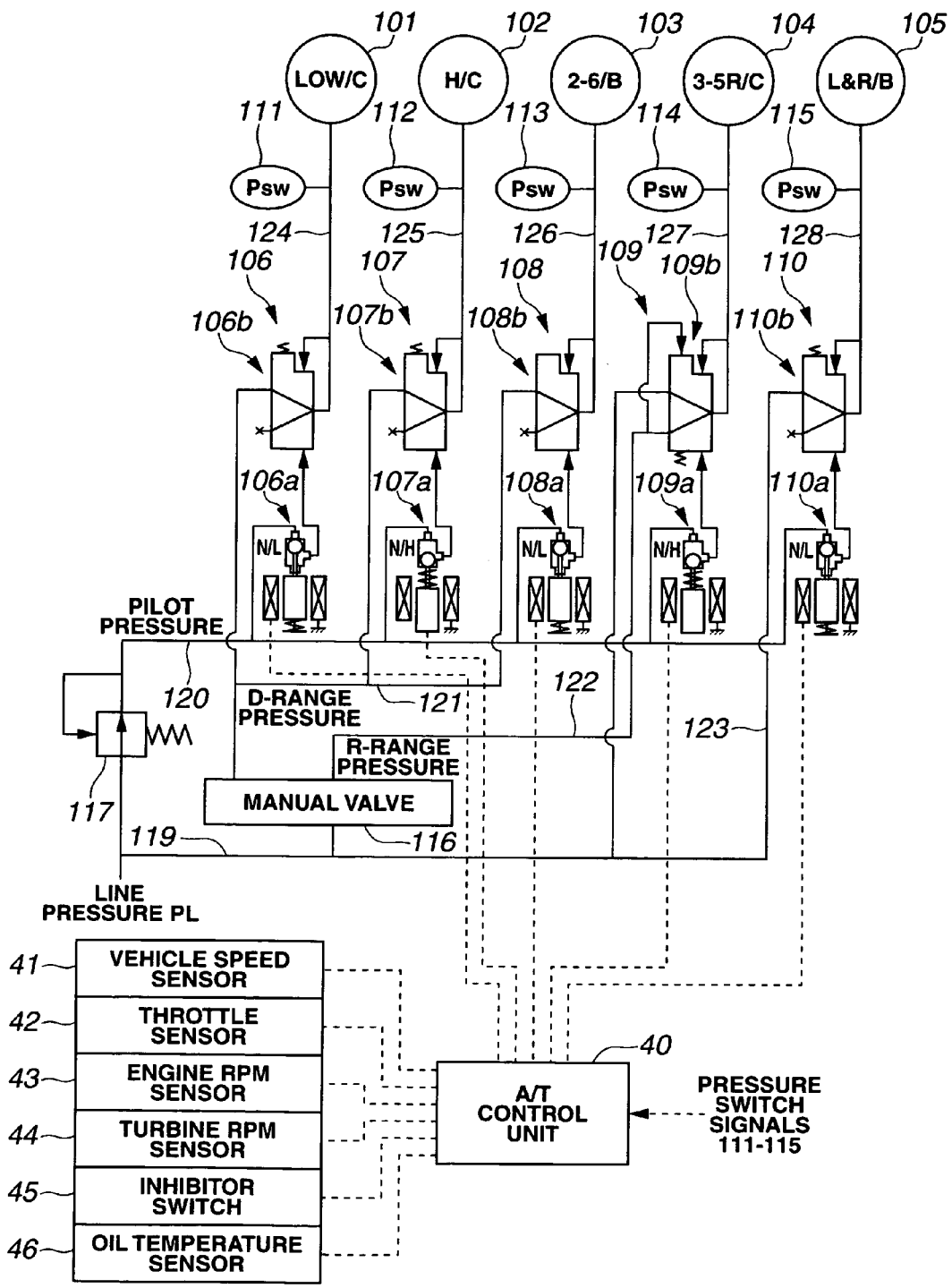
FIG. 3 is a schematic system diagram showing a hydraulic circuit and an electronic speed change (or electronic shift) control unit in the control apparatus for the automatic transmission.

Next, a hydraulic circuit and an electronic speed change control unit for achieving the above speed change control will be explained with reference to FIG. 3. In FIG. 3, reference sign 101 denotes an engagement piston chamber of the low clutch LOW/C. Reference sign 102 denotes an engagement piston chamber of the high clutch H/C. Reference sign 103 denotes an engagement piston chamber of the 2-6 brake 2-6/B. Reference sign 104 denotes an engagement piston chamber of the 3-5 reverse clutch 3-5R/C. Reference sign 105 denotes an engagement piston chamber of the low and reverse brake L&R/B.

The above low clutch LOW/C, high clutch H/C, 2-6 brake 2-6/B, 3-5 reverse clutch 3-5R/C, and low and reverse brake L&R/B are each engaged by providing the respective engagement piston chambers 101 to 105 with engaging pressure of D-range pressure or R-range pressure, while those are each disengaged or released by releasing this engaging pressure. Here, D-range pressure is a line pressure (PL) through a manual valve 116, and is produced only when the D-range is selected. R-range pressure is a line pressure (PL) through manual valve 116, and is produced only when the R-range is selected. And under a range other than the R-range, the R-range is communicated with a drain port and decompression does not occur.

In FIG. 3, reference sign 106 denotes a first pressure control valve that controls the engaging pressure led to the low clutch LOW/C. Reference sign 107 denotes a second pressure control valve that controls the engaging pressure led to the high clutch H/C. Reference sign 108 denotes a third pressure control valve that controls the engaging pressure led to the 2-6 brake 2-6/B. Reference sign 109 denotes a fourth pressure control valve that controls the engaging pressure led to the 3-5 reverse clutch 3-5R/C. Reference sign 110 denotes a fifth pressure control valve that controls the engaging pressure led to the low and reverse brake L&R/B.

First pressure control valve 106 has a first duty solenoid 106a that, with usage of a pilot pressure as an initial pressure, produces a speed change control pressure by a solenoid power, and a first pressure regulating valve 106b that, with usage of the D-range pressure as an initial pressure, regulates a low clutch pressure by using the speed change control pressure and a feedback pressure as operation signal pressures. First duty solenoid 106a is controlled according to a duty ratio. In more detail, when the solenoid is OFF, the low clutch pressure is 0 (zero). While when the solenoid is ON, the low clutch pressure increases with increase of the ON duty ratio.

Second pressure control valve 107 has a second duty solenoid 107a that, with usage of the pilot pressure as an initial pressure, produces a speed change control pressure by a solenoid power, and a second pressure regulating valve 107b that, with usage of the D-range pressure as an initial pressure, regulates a high clutch pressure by using the speed change control pressure and a feedback pressure as operation signal pressures. Regarding second duty solenoid 107a, when the solenoid is ON (namely, ON duty ratio is 100%), the high clutch pressure is 0 (zero). And, the smaller the ON duty ratio, the greater the high clutch pressure, then when the solenoid is OFF, the high clutch pressure becomes maximum.

Third pressure control valve 108 has a third duty solenoid 108a that, with usage of the pilot pressure as an initial pressure, produces a speed change control pressure by a solenoid power, and a third pressure regulating valve 108b that, with usage of the D-range pressure as an initial pressure, regulates a 2-6 brake pressure by using the speed change control pressure and a feedback pressure as operation signal pressures. Regarding third duty solenoid 108a, when the solenoid is OFF, the 2-6 brake pressure is 0 (zero). While when the solenoid is ON, the 2-6 brake pressure increases with increase of the ON duty ratio.

Fourth pressure control valve 109 has a fourth duty solenoid 109a that, with usage of the pilot pressure as an initial pressure, produces a speed change control pressure by a solenoid power, and a fourth pressure regulating valve 109b that, upon selection of D-range, with usage of the line pressure (PL) as an initial pressure, regulates a 3-5 reverse clutch pressure by using the speed change control pressure and a feedback pressure as operation signal pressures, and upon selection of R-range, with usage of the R-range pressure as an operation signal pressure, provides the line pressure (PL) (that is the R-range pressure) to the 3-5 reverse clutch 3-5R/C directly. With respect to the fourth duty solenoid 109a, when the solenoid is ON (namely, ON duty ratio is 100%), the 3-5 reverse clutch pressure is 0 (zero). And, the smaller the ON duty ratio, the greater the 3-5 reverse clutch pressure, then when the solenoid is OFF, the 3-5 reverse clutch pressure becomes maximum.

Fifth pressure control valve 110 has a fifth duty solenoid 110a that, with usage of the pilot pressure as an initial pressure, produces a speed change control pressure by a solenoid power, and a fifth pressure regulating valve 110b that, with usage of the line pressure (PL) as an initial pressure, regulates a low and reverse brake pressure by using the speed change control pressure and a feedback pressure as operation signal pressures. Regarding fifth duty solenoid 110a, when the solenoid is OFF, the low and reverse brake pressure is 0 (zero). While when the solenoid is ON, the low and reverse brake pressure increases with increase of the ON duty ratio.

In FIG. 3, reference sign 111 denotes a first pressure switch (hydraulic pressure switch; hydraulic pressure detecting means). Reference sign 112 denotes a second pressure switch (hydraulic pressure switch; hydraulic pressure detecting means). Reference sign 113 denotes a third pressure switch (hydraulic pressure switch; hydraulic pressure detecting means). Reference sign 114 denotes a fourth pressure switch (hydraulic pressure switch; hydraulic pressure detecting means). Reference sign 115 denotes a fifth pressure switch (hydraulic pressure switch; hydraulic pressure detecting means). Further, reference sign 116 denotes the manual valve, 117 denotes a pilot valve, 118 denotes a shuttle ball valve, 119 denotes a line pressure passage, 120 denotes a pilot pressure passage, 121 denotes a D-range pressure passage, 122 denotes a R-range pressure passage, 124 denotes a low clutch pressure passage, 125 denotes a high clutch pressure passage, 126 denotes a 2-6 brake pressure passage, 127 denotes a 3-5 reverse clutch pressure passage, and 128 denotes a low and reverse brake pressure passage.

That is, as seen in FIG. 3, first to fifth pressure switches 111 to 115, each of which detects the presence or absence of the engaging pressure by a switch signal (a case of the presence of engaging pressure is ON, a case of the absence of engaging pressure is OFF), are provided to their respective pressure passages of the low clutch pressure passage 124, high clutch pressure passage 125, 2-6 brake pressure passage 126, 3-5 reverse clutch pressure passage 127, and low and reverse brake pressure passage 128.

Furthermore, in FIG. 3, reference sign 40 is an A/T control unit (control means), 41 is a vehicle speed sensor, 42 is a throttle sensor (torque signal producing means), 43 is an engine rpm sensor, 44 is a turbine rpm sensor, 45 is an inhibitor switch, 46 is an oil temperature sensor. And the electronic speed change (or shift) control unit is formed by these unit, switch and sensors. A/T control unit 40 receives the switch signals from each of the first to fifth pressure switches 111 to 115 and also input signals from each of the switch and sensors 41 to 46, and processes these informational data signals on the basis of predetermined speed change control rule and a fail-safe control rule etc. Then A/T control unit 40 outputs solenoid driving signals to the first to fifth duty solenoids 106a to 110a in accordance with the result of the processing. The detail of A/T control unit 40 will be described later.

3. Explanation of The Speed Change Control

Next, speed change (or shift) control at the time of sequential shift, which is the feature of the present invention, will be explained along with a normal speed change control. As mentioned in BACKGROUND OF THE INVENTION, in a multispeed automatic transmission, the shift lines of the shift map become denser, and thus the frequency of carrying out the skip shift is increased. For instance, the so-called two skip shift from $4^{th}$ speed to $1^{st}$ speed such that a target speed is set to $1^{st}$ speed during vehicle travel at $4^{th}$ speed frequently occurs. Or the so-called three skip shift from $6^{th}$ speed to $2^{nd}$ speed such that the target speed is changed from $6^{th}$ speed to $2^{nd}$ speed frequently occurs. Furthermore, there also arises a case where these two and/or three skip shift are carried out by the positive shift operation of the driver.

In the following, among such skip shifts, a skip shift, of which speed change control is not programmed, is termed "the sequential shift". In more detail, the sequential shift indicates the skip shift other than a downshift from "n" speed to "n−2" speed. Further, this sequential shift includes both of a shift that is carried out across a plurality of speeds by crossing the shift lines of the shift map in accordance with change of operation condition of the vehicle, and a shift that is carried out across the plurality of speeds by the shift operation of the driver by means of a speed change or shift lever etc.

In the above-mentioned skip shifts, with resent to the one skip shift in a downshift direction, its speed change control data is previously programmed. And then, for example, in a case of a skip shift from $4^{th}$ speed to $2^{nd}$ speed, such a speed change control as a downshift from $4^{th}$ speed to $3^{rd}$ speed and to $2^{nd}$ speed (hereafter written as 4→3→2) is continuously carried out is not executed. Instead, a speed change control of a direct downshift from $4^{th}$ speed to $2^{nd}$ speed (4→2) is executed. On the other hand, with respect to a skip shift in an up-shift direction, its program that directly carries out the skip shift is not provided. For example, in a case of one skip shift from $2^{nd}$ speed to $4^{th}$ speed, two shifts is continuously carried out. That is, the continuous speed change shift 2→3→4 is carried out. This is because the drivability hardly deteriorates even if the speed change control is somewhat delayed, as compared with the case of the skip shift in the downshift direction.

Here, regarding the above one skip shift in the downshift direction, even in the case where its speed change control data is previously programmed, when the three skip shift (the sequential shift) 6→2 is carried out, it is required that one skip shift 6→4 (a first or primary shift or speed change) and another one skip shift 4→2 (a second or secondary shift or speed change) are continuously carried out. That is to say, in this case, the shift 6→4→2 is carried out in this way. However, as can be seen from the table of engagement state of frictional element in FIG. 2, although the 2-6 brake 2-6/B is released during the primary skip shift 6→4 (here, in this case, the $6^{th}$ speed corresponds to a first speed stage, the $4^{th}$ speed corresponds to a second speed stage), the 2-6 brake 2-6/B is engaged again during the next secondary shift 4→2 (here, in this case, the $2^{nd}$ speed corresponds to a third speed stage). Accordingly, in the sequential shift 6→2, the 2-6 brake 2-6/B is first released (an disengaging or disengagement control or a release control is first initiated) at the primary shift, and then the 2-6 brake 2-6/B is engaged again (an engaging or engagement control is initiated) at the time when the secondary shift is started. That is, the control of "release"→"engagement" of the 2-6 brake 2-6/B is continuously executed at the primary and secondary shifts.

Meanwhile, as for the up-shift, since the program for one skip shift is not provided as mentioned above, even in the case of the one skip shift, two shifts is continuously carried out. For instance, in a case of a sequential shift 3→5, the 3-5 reverse clutch 3-5R/C is first released at a primary shift 3→4, and then it is engaged again at a secondary shift 4→5.

As described above, a frictional element that is engaged (or has been engaged) at the first speed stage, and is released at the second speed stage achieved by the primary shift, and further is engaged again at the third speed stage achieved by the secondary shift, is termed "a first frictional element" hereafter. In the above case of the sequential shift 6→2, the 2-6 brake 2-6/B corresponds to the first frictional element. While, in the case of the sequential shift 3→5, the 3-5 reverse clutch 3-5R/C corresponds to the first frictional element.

3.1 Explanation of Function and Configuration

Figure 4:
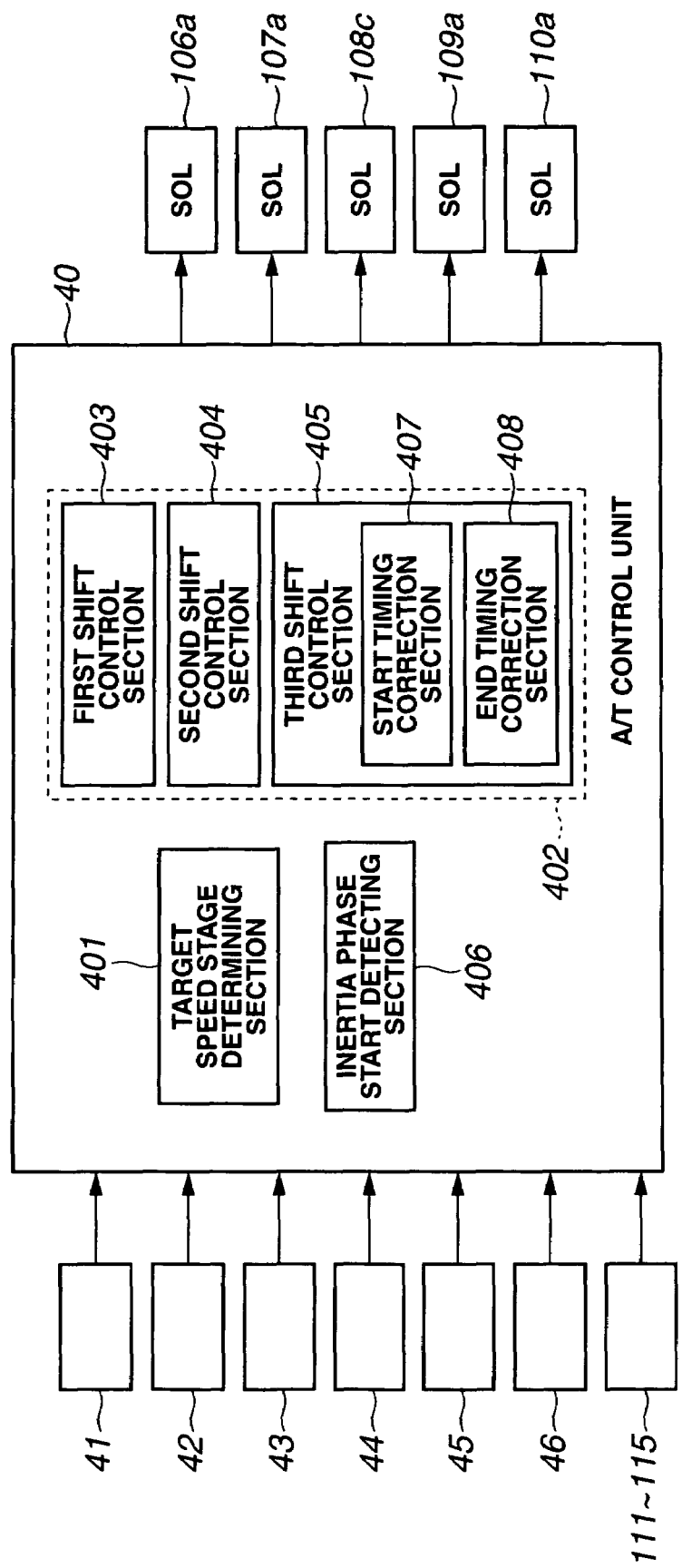
FIG. 4 is a block diagram showing function and configuration of an essential section in the control apparatus.

Next, the speed change control of the skip shift, which is the feature of the present invention, will be explained. FIG. 4 is a block diagram showing function and configuration of an essential section in the control apparatus. As can be seen in FIG. 4, at an input side of the above-mentioned A/T control unit 40, switch and sensors 41 to 46 and the first to fifth pressure switches 111 to 115 are connected. And at an output side of A/T control unit 40, the first to fifth duty solenoids 106a to 110a are connected.

On the other hand, in A/T control unit 40, a target speed stage determining or judging section (or means) 401, a shift control section (or means) 402, and an inertia phase start detecting section (or means) 406 are provided. Then, data processing is executed based on the informational data signals from the above sensors etc. in A/T control unit 40, and the solenoid driving signals are output to the first to fifth duty solenoids 106a to 110a. Target speed stage determining section (the judging section or means) 401 has the function of determining the target speed (the function of judging the shift or the speed change) on the basis of a depression amount of an accelerator pedal by the driver and vehicle operating information such as the vehicle speed, and a relationship between these information and vehicle speed etc. is set or stored in A/T control unit 40 as the shift map. As for the inertia phase start detecting section 406, it calculates an actual speed change gear ratio based on informational data signals from turbine rpm sensor 44, and detects or determines the start of the inertia phase on the basis of the calculated speed change gear ratio. This inertia phase start detecting section 406 is also configured to detect or determine the end of the inertia phase. Therefore, this inertia phase start detecting section 406 also functions as an inertia phase end detecting section (or means).

With respect to the shift control section 402, as seen in FIG. 4, it has a first shift control section or means (or simply, first control means) 403, a second shift control section or means (or simply, second control means) 404, and a third shift control section or means (or simply, third control means) 405. First shift control section 403 issues a command of hydraulic pressure so that the first frictional element is released and further a second frictional element is engaged at the above primary shift. Second shift control section 404 issues a command of hydraulic pressure so that the first frictional element is engaged and further a third frictional element is released at the above secondary shift.

Here, in these first and second shift control sections 403 and 404, a control program (a control data) is previously stored for each speed change pattern. Then, for both a speed change where ± one shift is carried out from a current speed and the one skip shift in the downshift direction (these are called normal shift), the speed change control is executed by using the control data stored in first and second shift control sections 403 and 404.

With respect to the third shift control section 405, it executes a control when an execution command of the two skip or over two skip shift in the downshift direction is issued, or when an execution command of the one skip or over one skip shift in the up-shift direction is issued. More specifically, when the above command is issued, third shift control section 405 initiates the secondary shift (a following shift) by second shift control section 404 before the primary shift (a previous or former shift) by first shift control section 403 is not finished or completed without waiting for the completion of the primary shift. That is, third shift control section 405 initiates the control of the secondary shift while executing the control of the primary shift, and especially during the overlap period of the primary and secondary shifts, adjusts the commands for each of the frictional elements and optimizes the speed change control. As shown in FIG. 4, third shift control section 405 has a start timing correction section (or means) 407 that corrects the timing for starting the secondary shift, and an end timing correction section (or means) 408 that corrects the end timing of the primary shift.

3.2 Explanation of Speed Change Control 3.2.0 Normal Speed Change Control

Before an explanation of the speed change control of the sequential shift, a normal speed change control that is a base for the speed change control of the sequential shift will be explained below. Although the normal speed change control is well known in the art, it will be described in detail for the purpose of clarifying the difference from the speed change control of the sequential shift that is the feature of the present invention. Here, as mentioned above, the normal speed change control indicates the control of shift that is carried out according to the control program (the control data) stored in first and second shift control sections 403 and 404. That is, with respect to the downshift, downshift "n→n−1" and also "n→n−2" correspond to the normal speed change. As for the up-shift, up-shift "n→n+1" corresponds to the normal speed change. In the following, the normal speed change control is termed "an independent speed change control" as well.

3.2.1 Normal Downshift

Figure 5:
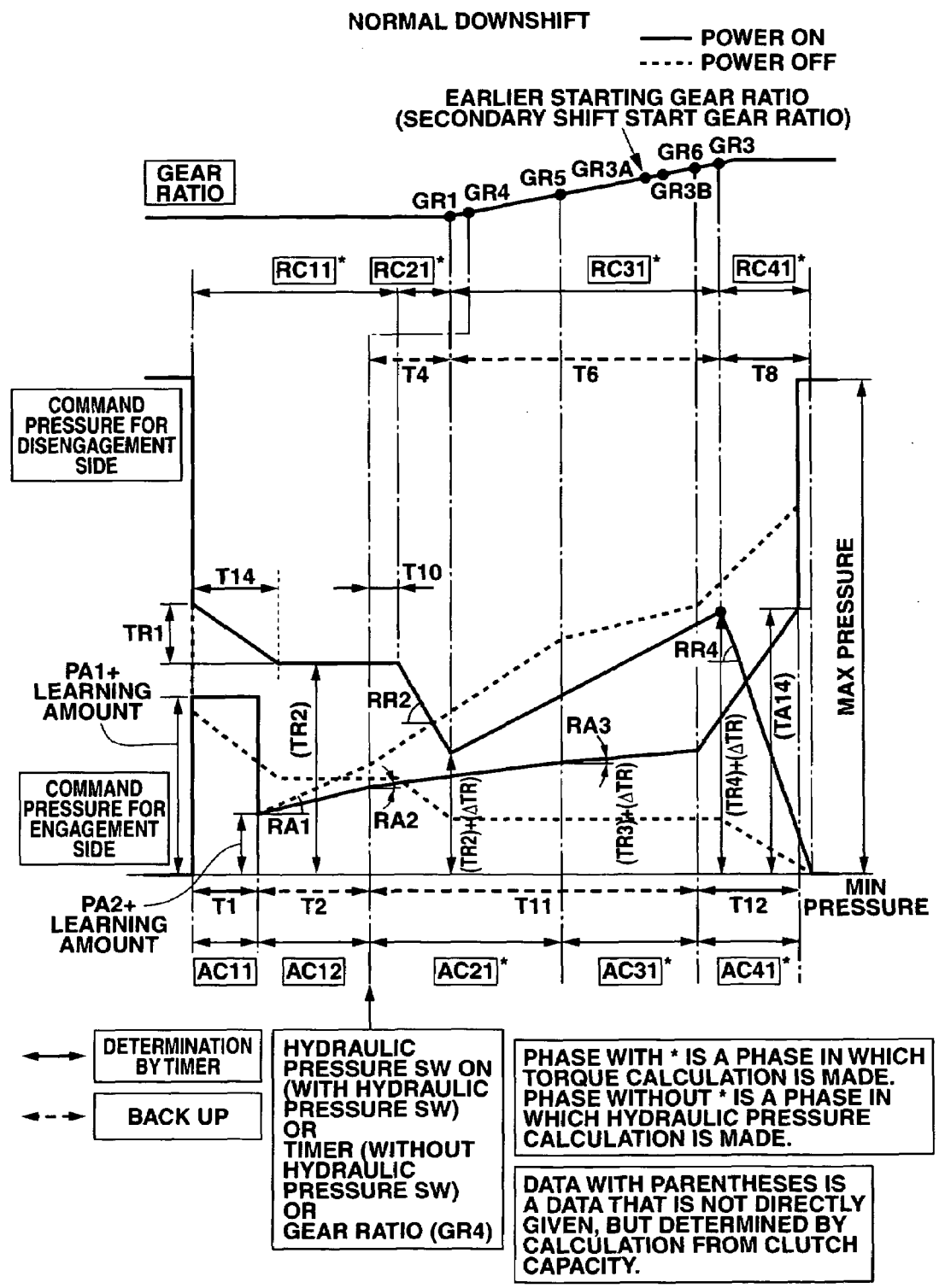
FIG. 5 is a time chart showing characteristics at a normal downshift in the control apparatus for the automatic transmission.
Figure 6:
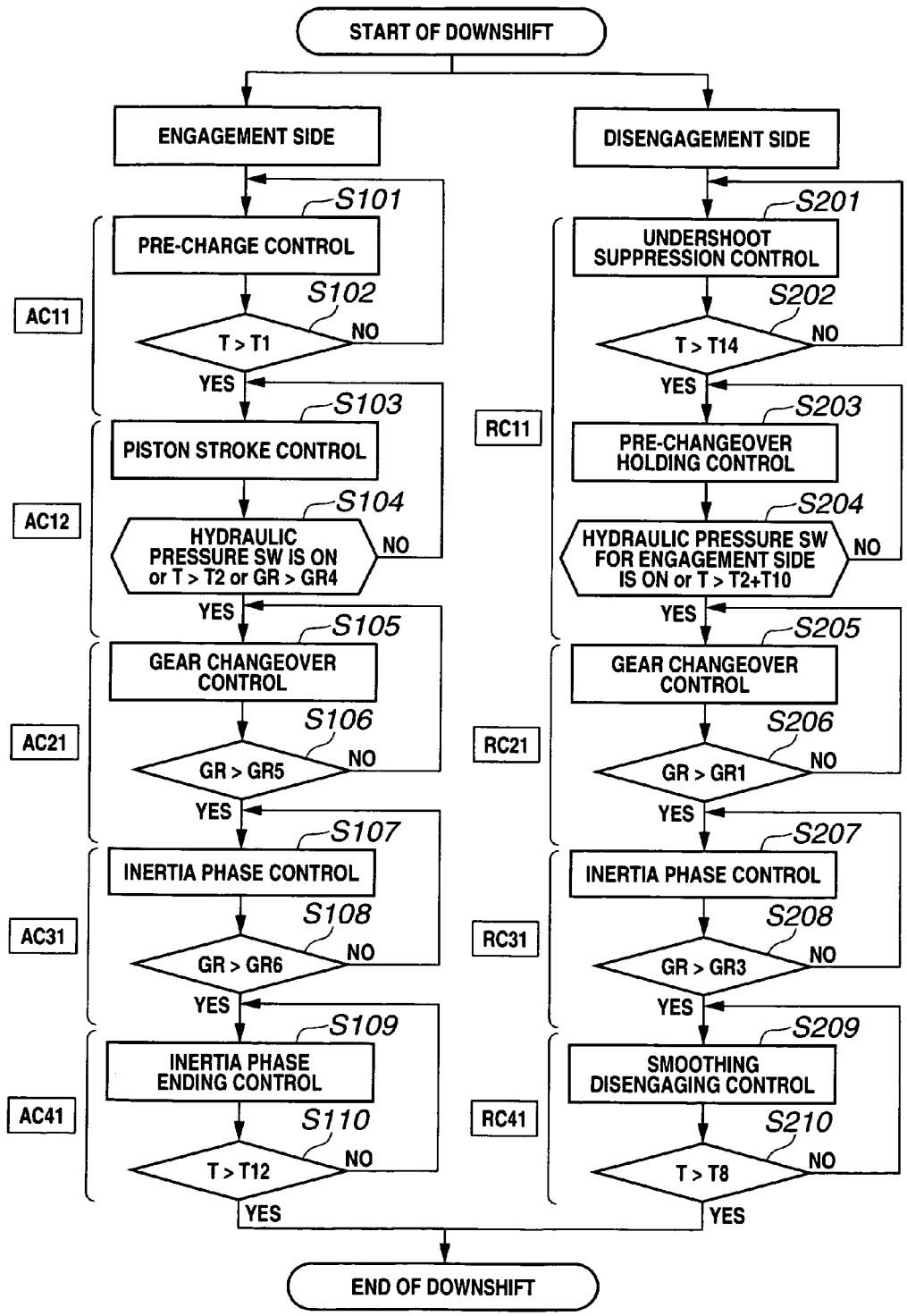
FIG. 6 is a flow chart for explanation of operation steps at the normal downshift in the control apparatus for the automatic transmission.

Firstly, a normal downshift will be explained below with reference to FIGS. 5 and 6. FIG. 5 is a time chart to explain the normal downshift, FIG. 6 is a flow chart of the normal downshift.

During vehicle travel at "n" speed (the first speed stage), when the operation condition of the vehicle changes and then the target speed is set to "n−1" speed (the second speed stage) by the shift map (target speed stage determining section) 401 stored in A/T control unit 40, a downshift from the "n" speed to "n−1" speed is initiated on the basis of a control signal from first shift control section 403. Upon the initiation of the downshift, a pre-charge control (a lash suppressing control) is executed for engagement side frictional elements that are going to be engaged, with the initiation of the downshift (see "AC11" in FIGS. 5, 6). This pre-charge control is executed in order to finish a piston stroke as quick as possible (or in order to advance the piston stroke). And, a high pressure command value such that the piston stroke reaches about 70% of an entire piston stroke (or such that the piston moves up or forward up to about 70% of the entire piston stroke) is output. Regarding the pressure command value at this time, it is output as a predetermined value PA1+a learning amount. After the above pressure command value (set value PA1+the learning amount) is output for a predetermined time "T1", the pressure command value is once lowered to such a pressure command value (a predetermined value PA2+a learning amount) as to keep or maintain the above lash suppressing condition after the pre-charge control for readying for the engagement of the frictional elements (see steps S101 and S102 in FIG. 6). Here, the learning of the learning amount is executed based on a time needed for starting the inertia phase and its rate of change.

After the predetermined time "T1" has elapsed, the control proceeds to a piston stroke control from the pre-charge control (see "AC12" in FIG. 5). In this piston stroke control, the piston stroke of a clutch of each engagement side frictional element is controlled by increasing the pressure command value with a predetermined gradient of "RA1" (or at a predetermined slope of "RA1") from the pressure command value (PA2+the learning amount) according to an input torque. In this case, the predetermined gradient "RA1" is set to such a value as to maintain the hydraulic pressure of the second frictional elements at a constant value (a first hydraulic pressure value). Further, this "RA1" is determined in consideration of a rising of an actual hydraulic pressure after the completion of the piston stroke control and variations in the piston stroke and so on (step S103 in FIG. 6). Here, in a case of a power-on downshift, a speed change control of the after-mentioned disengagement (or release) side frictional elements takes precedence over (or proceeds prior to) the control of the engagement side frictional elements. While, in a case of a power-off downshift, the control of the engagement side frictional elements takes precedence over (or proceeds prior to) the control of the disengagement side frictional elements. Therefore, as shown in FIG. 5, the predetermined gradient "RA1" of the case of the power-on downshift is set to be gentler than that of the power-off downshift. (in the above, the disengagement (or release) side frictional element is the frictional element that is going to be disengaged or released)

Then, by such pressure command values, the piston of the engagement side frictional element gradually moves forward under a constant hydraulic pressure, and when the piston stroke is completed, the hydraulic pressure switch (a piston stroke determining or judging unit or means) of the engagement side frictional element is turned ON. Therefore, upon detection of ON of the hydraulic pressure switch, the piston stroke control is terminated, and the control proceeds to the next "AC21" (step S104 in FIG. 6). Here, even if ON of the hydraulic pressure switch is not detected, a timer and a gear ratio are checked or monitored as a backup of the hydraulic pressure switch, and then, when a predetermined time "T2" has elapsed from a start of the piston stroke control, or when the gear ratio has reached a predetermined gear ratio "GR4" that is higher than an inertia phase start gear ratio "GR1", the piston stroke control is terminated.

On the other hand, as for the disengagement side frictional elements, an undershoot suppression control is first executed (see "RC11" in FIGS. 5 and 6). That is, when the downshift is initiated, a pressure command value for the disengagement side frictional element is lowered to a predetermined pressure command value "TR2" that is set according to the input torque. In this case, in order to suppress an excessive drop of the hydraulic pressure (namely, undershoot), a slightly high pressure command value (+"TR1") with respect to the target pressure command value "TR2" is output at a start of the speed change. Then after that, pressure command value is gradually lowered to the target pressure command value is "TR2" with taking a predetermined time "T14" (see steps S201 and S202 in FIG. 6).

With respect to the pressure command value "TR2", it is a pressure that initiates or starts the inertia phase, and also it corresponds to such a pressure that a clutch of the disengagement side frictional element slightly starts to slip or slide, in the case of the power-on downshift. While, in the case of the power-off downshift, the pressure command value "TR2" corresponds to such a pressure that the clutch of the disengagement side frictional element does not slip. When the predetermined time "T14" has elapsed, the control proceeds to a pre-changeover holding control ("RC11" in FIGS. 5 and 6). This pre-changeover holding control is a control that maintains an engagement of the clutch of the disengagement side frictional element by the hydraulic pressure "TR2" set according to the input torque until the piston stroke of the engagement side frictional element is completed in the case of the power-off downshift, and thereby keep the current speed of the transmission at or by the side of disengagement side frictional element (step S203).

In more detail about this, if both of the engagement and disengagement side frictional elements are disengaged or released at this time, it would cause a neutral condition and the engine would race. For the sake of prevention of such condition, this pre-changeover holding control is executed. On the other hand, in the case of the power-on downshift, by maintaining the pressure command value at the hydraulic pressure "TR2" set according to the input torque, the clutch of the disengagement side frictional element slightly slips. However, in this case, the current speed of the transmission is kept at or by the side of the engagement side frictional element. And afterwards, when ON of the hydraulic pressure switch of the engagement side frictional element is detected (the piston stroke control is terminated), or when a predetermined time "T2+T10" has elapsed, the pre-changeover holding control is terminated (step S204).

When the above "AC11" and "AC12" of the engagement side frictional element and "RC11" of the disengagement side frictional element are completed, the control proceeds to "AC21" and "RC21", and a gear changeover control is initiated. In this gear changeover control, when the piston stroke is completed (ON of the hydraulic pressure switch or the lapse of time "T2+T10") in the case of the power-off downshift, the hydraulic pressure exerted on the disengagement side frictional element is lowered with a predetermined gradient of "RR2" set according to the input torque (step S205). Meanwhile, as for the power-on downshift, in many cases, an inertia phase control ("RC31") is initiated before a start of the gear changeover control, and then cases where the gear changeover control of "RC21" is not carried out arise a lot. However, when the inertia phase is not initiated due to variations of the hydraulic pressure etc., this gear changeover control has the function of initiating the inertia phase by lowering the hydraulic pressure with the gradient of "RR2" as a backup, then the initiation of the inertia phase is urged. And when the gear ratio reaches the inertia phase judgment (or start) gear ratio "GR1", the gear changeover control is terminated and the control proceeds to the inertia phase control (step S206).

On the other hand, regarding the engagement side frictional element, its pressure command value is increased with a predetermined gradient of "RA2" set based on the input torque and the vehicle speed (step S105). Here, the predetermined gradient "RA2" at the power-off downshift is set for each input torque and each vehicle speed so that a pulling gradient (a decreasing gradient of an output shaft torque) becomes optimized. In addition, the gradient "RA2" is set so that the greater the input torque, the greater the gradient. While, at the power-on downshift, if the piston stroke is completed, an engagement capacity is not needed, and therefore the gradient "RA2" is set to a minimum gradient. And when the gear ratio reaches a predetermined gear ratio "GR5", the gear changeover control of the engagement side frictional element is finished and the control proceeds to the inertia phase control (step S106).

When the control proceeds to the inertia phase control ("AC31", "RC31"), in the case of the power-off downshift, the pressure command value of the disengagement side frictional element is lowered from the hydraulic pressure at the time of the detection of inertia phase, with a predetermined gradient set according to the input torque and the vehicle speed. While, in the case of the power-on downshift, the pressure command value of the disengagement side frictional element is increased with a predetermined gradient set according to the input torque and the vehicle speed, and the speed change progress is controlled at or by the side of disengagement side frictional element. Especially by increasing a clutch capacity, a drop of the output shaft torque and a progress of the speed change are delayed, and thereby facilitate the synchronization of engagement side frictional element at "n" speed (step S207). And when the gear ratio "GR" reaches a predetermined gear ratio "GR3" that is near or close to a gear ratio of "n−1" speed, the inertia phase control is terminated (step S208).

Meanwhile, as for the engagement side frictional element, when the control proceeds to the inertia phase control ("AC31"), the hydraulic pressure is increased with a predetermined gradient of "RA3" set based on the input torque and the vehicle speed. In the case of the power-off downshift, a slope (that is, gradient) is set to be gentle so that the speed change or shift can be gently completed at the end of the inertia phase from the middle thereof. While, in the case of the power-on downshift, since an engagement capacity is not needed, the slope is set to a minimum gradient (step S107). And when the gear ratio "GR" reaches a predetermined gear ratio "GR6" whose position is set before the above-mentioned gear ratio "GR3", the inertia phase control is terminated (step S108).

Afterwards, the control for the engagement side frictional element proceeds to an inertia phase ending control ("AC41"). In this inertia phase ending control, the hydraulic pressure is increased up to a predetermined hydraulic pressure "TA14" set based on the input torque, with taking a predetermined time "T12" (steps S109 and S110). With respect to the predetermined hydraulic pressure "TA14", it is a pressure that secures the setting of "n−1" speed. And by this hydraulic pressure, shift shock occurring due to variations in detection of an end of inertia phase can be prevented. When the predetermined time "T12" has elapsed, the hydraulic pressure (duty) is set to 100% and a maximum hydraulic pressure (MAX pressure) is output, and then the shift of the engagement side frictional element is completed.

On the other hand, as for the disengagement side frictional element, when the inertia phase control is finished, a smoothing disengaging control is executed ("RC41"). In this smoothing disengaging control, upon judging the end of inertia phase, the hydraulic pressure is lowered with a predetermined gradient (a first predetermined slope or gradient) of "RR4" set according to the input torque. And the control is executed so that the hydraulic pressure instantly becomes a minimum pressure (that is, pressure is zero) while suppressing torque fluctuations of output shaft (step S209). Then, when a predetermined time "T8" has elapsed after starting to lower the hydraulic pressure with the predetermined gradient "RR4", the hydraulic pressure (duty) is set to 0% and a minimum hydraulic pressure (MIN pressure, namely that pressure is zero) is output, and then the shift of the disengagement side frictional element is completed.

As explained above, the downshift of the normal speed change (the normal downshift) is carried out in this way by first shift control section 403.

3.2.2 Sequential Shift (Downshift)

Next, explanation of the speed change control of the sequential shift will be explained. FIG. 8 is a time chart showing characteristics at a downshift 6→2. FIG. 8A indicates a throttle opening TH. FIG. 8B indicates gear ratio (or transmission ratio) GR of the automatic transmission. FIG. 8C indicates hydraulic pressure command values for the frictional elements that are engaged or disengaged at the speed change (in more detail, hydraulic pressure command value (duty ratio) for each of the first to fifth pressure control valves 106 to 110 (as shown in FIG. 3) of the frictional elements.

With respect to this downshift 6→2, as described above, one skip shift 6→4 is first carried out in accordance with the preprogrammed control data at the primary shift, then another one skip shift 4→2 is carried out at the secondary shift. In this shift from the primary shift to the secondary shift, since the 2-6 brake 2-6/B is first disengaged or released then is engaged again (disengagement→engagement), this 2-6 brake 2-6/B corresponds to the first frictional element. Further, the low clutch LOW/C corresponds to the second frictional element. The high clutch H/C corresponds to the third frictional element.

During vehicle travel at $6^{th}$ speed (the first speed stage), when the operation condition of the vehicle changes (or, changes by the shift operation of the driver etc.) and then the target speed is set to $2^{nd}$ speed (the third speed stage) by the shift map (target speed stage determining section) 401 stored in A/T control unit 40, the primary shift of one skip downshift from $6^{th}$ speed (the first speed stage) to $4^{th}$ speed (the second speed stage) (6→4) is first initiated ("t1" in FIG. 8).

Then, a current actual gear ratio is compared with a first predetermined gear ratio (a secondary shift start gear ratio or an earlier starting gear ratio) "GR3A" whose position is set before an inertia phase end gear ratio "GR3" where or by which an end of the shift 6→4 (the primary shift) is judged. If the actual gear ratio does not reach the secondary shift start gear ratio "GR3A", the shift 4→2 (the secondary shift) is not initiated immediately, that is, the initiation of the control of this secondary shift is forbidden by third shift control section 405. The reason why this control is forbidden is because, if the secondary shift is carried out during the inertia phase, there is a possibility that an interlock will occur. Thus, to prevent the interlock, the initiation of the secondary shift is forbidden during the inertia phase.

After that, when the gear ratio reaches the secondary shift start gear ratio "GR3A", third shift control section 405 releases or cancels the prohibition of the secondary shift, and outputs a command of the initiation of the shift 4→2 (the secondary shift) to second shift control section 404 ("t2" in FIG. 8). Here, the reason why when the gear ratio reaches the secondary shift start gear ratio "GR3A" set before the end of the inertia phase, the secondary shift is initiated without waiting for the completion of the primary shift is because, if the secondary shift is initiated after waiting for the end of the primary shift, a time or duration of delay (or dead time) occurs between the end of the primary shift and the initiation of the secondary shift, which is caused by a delay in response of hydraulic pressure at the initiation of the secondary shift, and then a time required for the speed change might result in increase or long.

Therefore, in the transmission of the present invention, in the case of two skip or over two skip shift in the downshift direction, when the gear ratio reaches the secondary shift start gear ratio "GR3A" set before the inertia phase end gear ratio "GR3", the secondary shift is initiated (an earlier starting of the secondary shift). With respect to the secondary shift start gear ratio "GR3A", it is not a constant or fixed value, but always set when such skip shift is carried out. In addition, this secondary shift start gear ratio "GR3A" is set in consideration of the hydraulic pressure response delay of the secondary shift. More specifically, this first predetermined gear ratio (the secondary shift start gear ratio) "GR3A" is set so that a time point of the actual initiation of the secondary shift coincides with a time point of the end of the inertia phase (or a time period from the end of the inertia phase to the actual initiation of the secondary shift becomes the shortest), in view of the response delay of the secondary shift. Furthermore, in this transmission, the secondary shift start gear ratio "GR3A" is set as a gear ratio that is positioned before inertia phase end gear ratio "GR3" by a predetermined time (for example, 0.1 second).

In more detail about this secondary shift start gear ratio "GR3A", it is set according to the vehicle speed and parameters of shift at the second speed stage etc. Moreover, it is set so that the lower the vehicle speed, the greater the difference between the inertia phase end gear ratio (gear ratio at the second speed stage) "GR3" and the secondary shift start gear ratio "GR3A". In addition, the secondary shift start gear ratio "GR3A" is corrected so that the greater the input torque that is input to the transmission, the greater the above difference. This correction is executed by start timing correction section 407 provided in third shift control section 405. In this embodiment, as described above, as a parameter for initiation of the secondary shift, the secondary shift start gear ratio "GR3A" set before the inertia phase end gear ratio "GR3" where the primary shift is completed is used. However, instead of the "GR3A", a parameter corresponding to the first predetermined gear ratio could be used. In that case, for instance, the turbine rpm, an output shaft rpm of the transmission, or vehicle wheel speed etc. can be used as the parameter.

Here, as seen in FIG. 8 (FIG. 8C), when the gear ratio reaches the secondary shift start gear ratio "GR3A" (t=t2), the primary shift is not completed yet. Therefore, this means that the primary and secondary shifts partly overlap with each other. Especially during the overlap period of the primary and secondary shifts, different two commands for the disengaging control and for the engaging control are output to the 2-6 brake 2-6/B. In other words, it means that, to one frictional element (the 2-6 brake 2-6/B), the two different hydraulic pressure command are output.

In the transmission of the present invention, in order to prevent such contradiction in control, after the secondary shift has been initiated, third shift control section 405 compares the pressure command value for the 2-6 brake 2-6/B, which is output by first shift control section 403, with the pressure command value for the 2-6 brake 2-6/B, which is output by second shift control section 404. And then third shift control section 405 always selects a greater or higher pressure command value, and outputs it to third pressure control valve 108 of the 2-6 brake 2-6/B (this is called a select-high or select-HI control). And by executing this select-high control, the pressure command value for the 2-6 brake 2-6/B becomes a characteristic indicated by thick line in FIG. 8C. And thus, the two continuous shifts can be achieved smoothly, and it is possible to prevent or suppress the occurrence of the undesired shift shock.

In the following, with reference to flow charts in FIG. 7 in addition to FIG. 8, a downshift at the sequential shift will be explained. This sequential downshift control for the primary shift (previous or former shift) and the secondary shift (following shift) is basically the same as the control of the normal downshift (the independent downshift). However, a part of the control differs from the normal downshift control. In the flow charts of FIG. 7, therefore, the same steps (common steps) as the above-explained flow charts of FIG. 6 are denoted by the same step numbers, and the explanation that overlaps with the above explanation will be omitted, except that the explanation is needed.

Firstly, the primary shift will be explained below. With respect to the engagement side frictional element (the second frictional element: the low clutch LOW/C), the control is carried out in the same manner as the normal shift control (steps S101 to 110). Meanwhile, as for the disengagement side frictional element (the first frictional element: the 2-6 brake 2-6/B), steps S208 and S209 of the normal shift control are different. That is, upon the initiation of the after-→mentioned secondary shift, it is preferable that the pressure command value for the disengagement side frictional element at the primary shift is rapidly lowered so as to avoid the delay of the speed change or shift.

Thus, at the sequential shift, a correction that reduces or lowers the hydraulic pressure of the 2-6 brake 2-6/B to 0 (zero) with an earlier timing than the case of the independent shift 6→4 and also with a steep gradient (slope) is execute (steps S208' and S209' in FIG. 7). This correction is carried out by end timing correction section 408 provided in third shift control section 405. More specifically, as shown in FIG. 8, when the gear ratio reaches a second predetermined gear ratio (a first frictional element pressure release gear ratio) "GR3B" whose position is set before the inertia phase end gear ratio (gear ratio at the second speed stage) "GR3" where or by which the end of the inertia phase is judged, the hydraulic pressure is reduced (or released) to 0 (zero) with a steeper gradient "RR4S" than the gradient at the normal shift control (namely, the first predetermined slope or gradient "RR4"). By this correction, the 2-6 brake 2-6/B is rapidly disengaged or released. And except the above, the normal primary shift (shift 6→4) is carried out according to the control program stored in A/T control unit 40, and the shift 6→4 is finished.

Here, with respect to the above gradient of reduction of the hydraulic pressure (a pulling or removal gradient or slope), it is corrected so that the greater the input torque that is input to the 2-6 brake 2-6/B, the more steep the gradient becomes. This is because, as the input torque becomes greater, the hydraulic pressure of the 2-6 brake 2-6/B increases, and it therefore takes a time to release the hydraulic pressure, in addition, there is a possibility that the delay of the shift will occur during the speed change if the hydraulic pressure is not rapidly released. For this reason, by correcting the removal gradient according to the input torque in the above way, it is possible to suppress the delay, the interlock and the engine racing (or engine flare-up) during the speed change.

Next, the secondary shift (following shift) will be explained below. In the secondary shift, the steps in which the same process as the primary shift (previous shift) are executed are denoted by the same step numbers, and the explanation thereof will be omitted, except that the explanation is needed. In the secondary shift, if the normal shift control (the same control as the primary shift) is applied to the secondary shift as it is, the pressure command value is output such that the 2-6 brake 2-6/B (the first frictional element) is engaged by second shift control section 404. However, the primary shift is not completed yet at this time point. Because of this, the pressure command value has been output so as to disengage or release the 2-6 brake 2-6/B by first shift control section 403. That is, it means that, during the overlap period after the initiation of the secondary shift (t=t2), to one frictional element (the 2-6 brake 2-6/B), the two different hydraulic pressure commands for the disengaging control and for the engaging control are output.

Thus, in this case, as described above, the pressure command value for the 2-6 brake 2-6/B, which is output by first shift control section 403, and the pressure command value for the 2-6 brake 2-6/B, which is output by second shift control section 404, are compared by third shift control section 405. Then, the select-high control is made, in which third shift control section 405 selects the greater pressure command value and outputs it as the pressure command value for the 2-6 brake 2-6/B (step S100). Regarding this select-high control, it is carried out until the primary shift is completed.

Further, in the secondary shift of the sequential shift, as shown in FIG. 8C, the pre-charge control of the engagement side frictional element is forbidden. That is, in the flow chart of FIG. 7, the prohibition of the pre-charge control (step S101') is applied in place of the pre-charge control (step S101) of the primary shift. The reason why the pre-charge control is forbidden is because the piston stroke of the 2-6 brake 2-6/B is finished by first shift control section 403 at the time of the initiation of the secondary shift, and further because if a high hydraulic pressure for suppressing the lash is output in such condition, an actual hydraulic pressure follows the high pressure command value (the actual pressure becomes the high pressure), and therefore there is a risk that the shock will occur due to an occurrence of the clutch capacity.

Thus, at the time of the initiation of the secondary shift, by canceling the pre-charge control of the engagement side frictional element, the occurrence of the shock can be prevented. In this case, the predetermined value PA2+the learning amount, which is set at the end of the pre-charge control of the engagement side frictional element in the primary shift, is used as an initial value for the engagement side frictional element at the secondary shift. And afterwards, in the same manner as the primary shift, the predetermined value PA2+ the learning amount is maintained until the predetermined time "T1" elapses (step S102), and the control proceeds to the piston stroke control (step S103).

With respect to the piston stroke control, the piston of the engagement side frictional element gradually moves forward under the constant hydraulic pressure. Here, in the above-mentioned primary shift, under the piston stroke control, when the hydraulic pressure switch is turned ON, the completion of the piston stroke control is judged and the control proceeds to the next "AC21". However, in this secondary shift, the engagement side frictional element is the same frictional element (the 2-6 brake 2-6/B) as the disengagement side frictional element at the primary shift. And at the initiation of the secondary shift, which overlaps with the primary shift, since the hydraulic pressure has been already increased sufficiently, the hydraulic pressure switch is already turned ON. Therefore, if the completion of the piston stroke is judged by ON of the hydraulic pressure switch as a trigger in the same way as the primary shift, a piston stroke phase does not arise.

For this reason, in this secondary shift, it is forbidden to use ON of the hydraulic pressure switch as the trigger. Then, by the lapse of the predetermined time "T2+T10", the control proceeds to the gear changeover control (step S104'). And after this control, the same processes for the engagement side frictional element as the primary shift are carried out (steps S105 to S110). As explained above, regarding the engagement side frictional element at the secondary shift, the pressure command value is set in accordance with the steps S100 to S110, and also the pressure command value is compared with the pressure command value of the disengagement side frictional element at the primary shift, then the greater or higher value is selected as the pressure command value that is actually output (the select-high control).

By this control, the pressure command value for the frictional element (the 2-6 brake 2-6/B) that is released at the primary shift and is engaged at the secondary shift becomes the characteristic indicated by thick line in FIG. 8C. And it can provide consistency in the control during the overlap period of the speed change, then the two continuous shifts can be achieved smoothly, and it is possible to prevent or suppress the occurrence of the undesired shift shock.

On the other hand, as for the disengagement side frictional element (the third frictional element: the high clutch H/C), the following control is executed. Here, in the case of the independent downshift 4→2, in the same way as the above-mentioned primary shift, for the sake of avoiding the undershoot of the hydraulic pressure, upon the initiation of the shift, second shift control section 404 lowers the hydraulic pressure of the high clutch H/C in steps to a second pressure command value (a second hydraulic pressure value "TR2"+"TR1") that has a margin with respect to a third pressure command value (a third hydraulic pressure value "TR2"; an upper limit hydraulic pressure value by which the high clutch H/C can not transmit the input torque by itself) (see dotted line in FIG. 8C).

However, in this embodiment, in the case where the sequential shift is carried out and where a share ratio at the first speed stage is greater than that at the second speed stage, there is a possibility that the high clutch H/C of the third frictional element will slip at the overlap period. Therefore, in order to prevent this slip of the high clutch H/C, an initial pressure correction according to the share ratio is made (step S201'). Here, the share ratio is a ratio (or rate) of torque which each frictional element has or covers or receives at each speed stage, when the input torque is 1.

As will be explained in more detail, in a case where a share ratio (0.722) of the high clutch H/C at the second speed stage ($4^{th}$ speed) is smaller than a share ratio (1.000) of the high clutch H/C at the first speed stage ($6^{th}$ speed), if the speed change control is carried out based on the data of the normal secondary shift during the primary shift, the hydraulic pressure of the third frictional element is lowered to a hydraulic pressure corresponding to the share ratio at $4^{th}$ speed under a condition in which a share ratio before completion or establishment of the $4^{th}$ speed, namely a share ratio at $6^{th}$ speed, is required. That is, a shortage of the capacity of the high clutch H/C arises by 1.39 (the first speed stage ($6^{th}$ speed) share ratio (1.000)/the second speed stage ($4^{th}$ speed) share ratio (0.722)=1.39), and therefore there is a possibility that flare-up of the gear ratio (a state in which the gear ratio can not be fixed) will arise due to the capacity shortage.

Thus, in the transmission of this embodiment, by properly correcting the second pressure command value according to the share ratios at the first and second speed stages, the flare-up of the gear ratio is suppressed. Here, in a case where a relationship of the share ratio of the third frictional element is opposite (the first speed stage share ratio<the second speed stage share ratio), since the capacity shortage does not arise, the execution of such correction is not required.

And the pressure command value is reduced to the third pressure command value with taking a predetermined time "T1S" set for the following shift (step S202'), and after that, the control proceeds to the same pre-changeover holding control as the normal shift (step S203). With respect to the predetermined time "T1S" at step 5202', it is set to a shorter period of time than the predetermined time "T14" set at the normal downshift. This is for reducing the delay time at an intermediate or medium speed stage.

In this pre-changeover holding control, the hydraulic pressure is maintained at the hydraulic pressure "TR2" according to the input torque until the piston stroke of the engagement side frictional element is finished, and the speed change (or current speed stage) is kept at or by the side of disengagement side frictional element. Here, in the case of the normal shift, upon detection of ON of the hydraulic pressure switch, the control proceeds to the next gear changeover control. However, at the secondary shift of this sequential shift, it is forbidden to use ON of the hydraulic pressure switch as the trigger. And then, upon judging that the predetermined time "T2+T10" elapses, the control proceeds to the next gear changeover control (step S204').

The reason why it is forbidden to use ON of the hydraulic pressure switch as the trigger is because the hydraulic pressure switch is already ON state, and the prevention against going out of synchronization with a gear changeover control start timing of the engagement side frictional element is taken. Then, as described above, by equalizing both count-times for the engagement and disengagement side frictional elements, the controls for the engagement and disengagement side frictional elements can proceed to the gear changeover control at the same time. And after that, the control is executed in the same manner as the normal shift. That is, the hydraulic pressure is gradually lowered with the predetermined gradient set according to the input torque and the vehicle speed (the inertia phase control), and when the gear ratio reaches the predetermined gear ratio, the hydraulic pressure is lowered toward 0 (zero), and then the speed change is terminated.

As explained above, even in the case of the sequential shift, the optimum shift control is basically executed by using the control program (control data) previously stored in first and second shift control sections 403 and 404. As a result, a new or additional program does not need installing for the sequential shift. And the increase of the speed change data can be minimized. Further, since the secondary shift is initiated before the end of the primary shift, it is possible to shorten or reduce the time required to reach the final target speed (or final target speed stage) without having to increase the hydraulic pressure of the first frictional element (the 2-6 brake 2-6/B). That is, after the overlap timing of the shift, the hydraulic pressure of the first frictional element is set to the greater pressure command value (the greater pressure command value is selected. Namely that the select-high control is made). And by this select-high control, the hydraulic pressure of the first frictional element can continuously vary or change, and thereby carrying out the two continuous shifts speedily and smoothly and also suppressing the occurrence of the shift shock.

3.2.3 Normal Up-Shift

Next, an up-shift (n→n+1) at the normal speed change will be explained below with reference to FIGS. 9 and 10. FIG. 9 is a time chart showing characteristics at the normal up-shift. FIG. 10 is a flow chart for the normal up-shift.

Upon the initiation of the up-shift, the pre-charge control (the lash suppressing control) is executed for the engagement side frictional element with the initiation of the up-shift ("AC11", steps S301, S302), and afterwards, the piston stroke control is executed ("AC12", steps S303, S304). These pre-charge control and piston stroke control are the same as the above controls for the downshift. The detailed explanation will therefore be omitted.

After the piston stroke control, the gear changeover control of "AC21" is initiated. In this gear changeover control, the pressure command value is increased with a predetermined gradient "RA2" set based on the input torque and the vehicle speed (step S305). And when the gear ratio reaches a predetermined gear ratio "GR1", the gear changeover control is terminated, and the control proceeds to the inertia phase control (step S306). Here, the predetermined gradient "RA2" is set so that a pulling gradient (a decreasing gradient of the output shaft torque during a torque phase) becomes optimized. In addition, the gradient "RA2" is set so that the greater the input torque, the greater the value of the gradient "RA2". Further, regarding this hydraulic pressure gradient, it also serves to prevent a hydraulic pressure surge and the shift shock which occur at the time when the control is switched over from the gear changeover control to the inertia phase control. Here, at the time of a power-off up-shift, a case also arises where the inertia phase is detected before the initiation of the gear changeover control and then the control proceeds to the inertia phase control without the execution of the this control (the gear changeover control).

When the control proceeds to the inertia phase control, the hydraulic pressure is increased with a predetermined gradient "RA3" set based on the input torque and the vehicle speed (step S307). With respect to the gradient "RA3", it is a value that is smaller than the gradient "RA2" of the gear changeover control. The hydraulic pressure is therefore gradually increased with a relatively gentle gradient. And when the gear ratio "GR" reaches an inertia phase end gear ratio "GR2", this control is terminated (step S308).

Afterwards, the control proceeds to the inertia phase ending control ("AC41"). In this inertia phase ending control, the hydraulic pressure is increased with a gradient "RA4" (constant value) that is greater than the gradient "RA3" with taking a predetermined time "T8". Here, if the pressure command value (the hydraulic pressure) is suddenly or sharply increased, there is a possibility that the shift shock will occur due to the variations in detection of the end of inertia phase. Because of this, the hydraulic pressure is increased with the predetermined gradient "RA4" (steps S309, S310).

And when the predetermined time "T8" has elapsed, the pressure command value (duty) is set to 100% and a maximum hydraulic pressure (MAX pressure) is output, and then the shift of the engagement side frictional element is completed. On the other hand, as for the disengagement side frictional element, in the same manner as the downshift, the undershoot suppression control is first executed (steps S401, S402). And afterwards, the control proceeds to the pre-changeover holding control (steps S403, S404). That is, as shown in FIG. 9, when the up-shift is initiated, the hydraulic pressure of the disengagement side frictional element is lowered to a predetermined pressure command value "TR2". At this time, in order to suppress or prevent the excessive drop of the hydraulic pressure (the undershoot), a slightly high pressure command value (+"TR1") with respect to the target pressure command value "TR2" is output at a start of the speed change. Then after that, the pressure command value is gradually lowered to the target pressure command value "TR2" with taking a predetermined time "T15". Regarding the pressure command value "TR2", it is a limit value by which the clutch of the disengagement side frictional element does not slip.

Then, by maintaining the hydraulic pressure at such limit value (hydraulic pressure limit value) "TR2", when the predetermined time "T15" elapses and the control is switched over to the gear changeover control, the clutch capacity promptly drops with the decrease of the hydraulic pressure and the shift proceeds. Here, in the case of the power-off up-shift, instead of the pressure command value "TR2", a constant pressure command value "TR3" (<"TR2") is used. Afterwards, the gear changeover control ("RC21") is initiated. In this gear changeover control, a gradient (a third predetermined slope or gradient) of the pressure command value is set so that the hydraulic pressure becomes the pressure command value "TR3" set in the case of the above power-off up-shift at the time of lapse of a predetermined time "T16". And the pressure command value is gradually reduced with this gradient (step S405).

And when the predetermined time "T16" elapses and the hydraulic pressure reaches the pressure command value "TR3", the hydraulic pressure is maintained at the pressure command value "TR3" until the gear ratio becomes the inertia phase judgment gear ratio "GR1". After that, the control proceeds to an inertia phase pressure removal control of "RC31". Here, if the gear ratio reaches the inertia phase judgment gear ratio "GR1" before the lapse of the predetermined time "T16", the control proceeds to the inertia phase pressure removal control at this time point (step S406).

When the control proceeds to the inertia phase pressure removal control, the pressure command value is gradually reduced with such a gentle gradient that the hydraulic pressure is lowered to 0 (zero) with taking a predetermined time "T17" (step S407). The reason why the pressure command value is not set to 0 (zero) at once is because the prevention of the occurrence of the shift shock is taken. That is, by setting the predetermined time "T17" as a time required for the gear ratio to reach a speed change completion (or end) gear ratio from the inertia phase judgment gear ratio "GR1", and then by gradually lowering the hydraulic pressure for the time period of this predetermined time "T17", the speed change is completed without the occurrence of the shift shock.

The hydraulic pressure is lowered in this way, when a predetermined time "T8" elapses after the inertia phase end gear ratio "GR2" is judged, the pressure command value is set to 0 (zero) and the shift is completed (step S408). As explained above, the normal up-shift is carried out by first shift control section 403.

3.2.4 Sequential Shift (Up-shift)

Next, the control of an up-shift 3→5 of the sequential shift will be explained with reference to a time chart in FIG. 12. As is the same as FIG. 8, FIG. 12A indicates a throttle opening TH. FIG. 12B indicates a gear ratio GR of the automatic transmission. FIG. 12C indicates hydraulic pressure command values for the engagement and disengagement side frictional elements.

In the case of this up-shift 3→5, the 3-5 reverse clutch 3-5R/C is first released and then is engaged again ("release"→"engagement") by the control. Therefore, this 3-5 reverse clutch 3-5R/C corresponds to the first frictional element. While, the high clutch H/C corresponds to the second frictional element, the low clutch LOW/C corresponds to the third frictional element.

During vehicle travel at $3^{rd}$ speed (the first speed stage), when the operation condition of the vehicle changes (or, changes by the shift operation of the driver etc.) and then the target speed is set to $5^{th}$ speed (the third speed stage) by the shift map (target speed stage determining section) 401, an up-shift from $3^{rd}$ speed to $4^{th}$ speed (3→4) (the primary shift) is first initiated on the basis of the control signal from first shift control section 403 (t=t1 in FIG. 12).

The speed change control of this primary shift (previous or former shift) is the same as the above-mentioned normal up-shift, the detailed explanation of the primary shift will therefore be omitted. When the primary shift starts, the gear ratio "GR" starts to change from current $3^{rd}$ speed gear ratio toward $4^{th}$ speed gear ratio (the inertia phase starts; see "t1'" in FIG. 12). Then, upon judging the start of the inertia phase, a current actual gear ratio is compared with a first predetermined gear ratio (a secondary shift start gear ratio or an earlier starting gear ratio) "GR2A" whose position is set before the inertia phase end gear ratio "GR2" where or by which an end of the shift 3→4 (the primary shift) is judged.

If the actual gear ratio does not reach the above secondary shift start gear ratio "GR2A", the secondary shift is not initiated immediately, and the initiation of the control of this secondary shift is forbidden by third shift control section 405. After that, when the actual gear ratio reaches the secondary shift start gear ratio "GR2A", in the same manner as the above-mentioned downshift, the prohibition of the secondary shift is released or cancelled, and third shift control section 405 outputs a command of the initiation of the shift 4→5 (the secondary shift) (see "t2" in FIG. 12).

Here, the reason why when the gear ratio reaches the secondary shift start gear ratio "GR2A" set before the end of the inertia phase, the secondary shift is initiated without waiting for the completion of the primary shift is because, same as the case of the downshift, if the secondary shift is initiated after waiting for the end of the primary shift, a time of delay (or dead time) occurs between the end of the primary shift and the initiation of the secondary shift, which is caused by a delay in response of hydraulic pressure at the initiation of the secondary shift, and then a time required for the speed change might result in increase or long.

Thus, in the transmission of the present invention, when the actual gear ratio reaches the secondary shift start gear ratio "GR2A" set before the inertia phase end gear ratio "GR2", the secondary shift is initiated (the earlier starting of the secondary shift). With respect to the secondary shift start gear ratio "GR2A", also in the same way as the downshift, it is not a constant or fixed value, but always set when such skip shift is carried out. In addition, this secondary shift start gear ratio "GR2A" is set in consideration of the hydraulic pressure response delay of the secondary shift. That is, this first predetermined gear ratio is a gear ratio that is set so that a time point of the actual initiation of the secondary shift coincides with a time point of the end of the inertia phase (or a time period from the end of the inertia phase to the actual initiation of the secondary shift becomes the shortest), in view of the response delay of the secondary shift. And this secondary shift start gear ratio "GR2A" is set so that a time period from the initiation of the secondary shift (t2) to the end of the inertia phase becomes a constant time.

Regarding method or way of set of this secondary shift start gear ratio "GR2A", it is the same as that of the secondary shift start gear ratio "GR3A" at the downshift. Therefore, an explanation of the ways of set and correction of this gear ratio "GR2A" will be omitted. Now, when the secondary shift is initiated at t=t2, such a pressure command value that the 3-5 reverse clutch 3-5R/C (the first frictional element) is engaged is output under the speed change control. However, at this time point, since the primary shift is not finished yet, different pressure command value has been already output so as to release the 3-5 reverse clutch 3-5R/C (the first frictional element). That is, it means that, during the overlap period from the initiation of the secondary shift (t2) to an end of the primary shift (t3) (or during the overlap period between the previous and following shifts), to one frictional element (the 3-5 reverse clutch 3-5R/C), the two different control commands for the disengaging control and for the engaging control are output.

Thus, in the transmission of the present invention, in order to prevent such contradiction in control, after the secondary shift has been initiated, third shift control section 405 compares the pressure command value for the 3-5 reverse clutch 3-5R/C, which is output by first shift control section 403, with the pressure command value for the 3-5 reverse clutch 3-5R/C, which is output by second shift control section 404. And then third shift control section 405 always selects a greater or higher pressure command value, and finally outputs it to fourth pressure control valve 109 of the 3-5 reverse clutch 3-5R/C (the select-high control).

And by executing this select-high control, the pressure command value for the 3-5 reverse clutch 3-5R/C becomes a characteristic indicated by thick line in FIG. 12C. And thus, the two continuous shifts can be achieved smoothly, and it is possible to prevent or suppress the occurrence of the undesired shift shock, at the up-shift too, same as the case of the downshift. Here, in the case of the normal shift, when the control proceeds to the inertia phase pressure removal control after the gear changeover control, the hydraulic pressure of the first frictional element, which is lowered with the third predetermined gradient, is further lowered to 0 (zero), and the first frictional element is released (see "RC31" in FIG. 9). However, at this sequential shift, the decrease or reduction to 0 (zero) of the hydraulic pressure of the first frictional element is forbidden by end timing correction section 408. And then, the pressure command value is corrected such that the hydraulic pressure is maintained at a predetermined hydraulic pressure (a release pressure) until the initiation of the secondary shift. Here, the above release pressure is such a pressure command value that the clutch of the first frictional element can keep a condition equivalent to the completion of the piston stroke.

The reason why this correction is made is because, if the control is executed at the sequential shift so that the hydraulic pressure of the first frictional element is lowered to 0 (zero) with the predetermined gradient after judging the completion of the piston stroke of the second frictional element (after judging the end of the gear changeover control "AC21") in the same way as the normal primary shift, the hydraulic pressure completely becomes 0 (zero) before the start of the secondary shift and therefore the piston of the first frictional element has to be moved up or forwards again at the start of the secondary shift, and this delays an actual start of the secondary shift.

Thus, at the sequential shift, as described above, by keeping the release pressure at the end of the primary shift by end timing correction section 408, the delay of the gear ratio (the delay of shift) at the second speed stage can be prevented, and the shift from the primary shift to secondary shift can therefore be achieved smoothly and speedily without feeling an awkward shift or awkward switching over from the primary shift to secondary shift. In the following, with reference to flow charts in FIG. 11 in addition to FIG. 12, an operation of the up-shift at the sequential shift will be explained. However, regarding the primary shift, it is not changed with respect to the above-mentioned normal up-shift (independent up-shift) at the primary shift (previous or former shift), except that the release pressure is maintained at the end of the primary shift. Therefore, the explanation of the primary shift will be omitted.

As for the secondary shift (following shift), a different control from the normal up-shift will be mainly explained. Regarding steps in FIG. 11, the same steps as the steps explained in FIG. 10 are denoted by the same step numbers, and the explanation will be omitted, except that the explanation is needed. Now, when the first predetermined gear ratio (secondary shift start gear ratio or earlier starting gear ratio) "GR2A" is detected, second shift control section 404 initiates the secondary shift. And when the secondary shift is initiated, the select-high control is first executed by third shift control section 405, in which a release or disengagement side pressure command value for the first frictional element (the 3-5 reverse clutch 3-5R/C) (that is, the pressure command value for releasing the first frictional element) at the primary shift and an engagement side pressure command value for the first frictional element (that is, the pressure command value for engaging the first frictional element) at the secondary shift are compared with each other, and the greater pressure command value is always selected and is output (step S300).

Next, the pre-charge control for the engagement side frictional element is forbidden (step S301'). The reason of this prohibition of the pre-charge control is the same as that explained about the step S101' in FIG. 8C, described in 3.2.2 Sequential Shift (Downshift). That is, at the start of the secondary shift, the release pressure of the 3-5 reverse clutch 3-5R/C is maintained by first shift control section 403. And if the high hydraulic pressure for suppressing the lash is output in this condition, the actual hydraulic pressure follows the pressure command value (the actual pressure becomes the high pressure), and therefore there is the risk that the shock will occur due to the occurrence of the clutch capacity. Because of this, the pre-charge control is forbidden. Then, in this case, the predetermined value PA2+the learning amount, which is set at the end of the pre-charge control for the engagement side frictional element in the primary shift, is used as an initial value for the engagement side frictional element at the secondary shift.

And afterwards, in the same manner as the primary shift, the predetermined value PA2+the learning amount is maintained until the predetermined time "T1" elapses (step S302), and the control proceeds to the piston stroke control (step S303). In the piston stroke control, at the start of the secondary shift, the hydraulic pressure switch is already turned ON, and if the completion of the piston stroke is judged by ON of the hydraulic pressure switch as a trigger in the same way as the primary shift, the piston stroke phase does not arise. For this reason, in this secondary shift, it is forbidden to use ON of the hydraulic pressure switch as the trigger. Then, by the lapse of the predetermined time "T2", the control proceeds to the gear changeover control (step S304'). And after this control, the same processes for the engagement side frictional element as the primary shift are carried out (steps S305 to S310).

Next, the control for the disengagement side frictional element will be explained. At step S401', second shift control section 404 forbids the undershoot suppression control that is executed at the primary shift (see step S401 in FIG. 10). And the initial pressure correction (a torque share ratio correction) is carried out for suppressing the flare-up of the gear ratio, in the same manner as the step S201' in FIG. 7, described in 3.2.2 Sequential Shift (Downshift) (step S401'). More specifically, in a case where a share ratio of the third frictional element (the low clutch LOW/C) at the second speed stage ($4^{th}$ speed) is smaller than a share ratio at the first speed stage ($3^{rd}$ speed), (the share ratio at the first speed stage)/(the share ratio at the second speed stage) is calculated as a correction ratio. Then, by multiplying the hydraulic pressure "TR1" by this correction ratio, the pressure command value is corrected.

And then, the pressure command value is reduced to the third pressure command value "TR2" with taking the predetermined time "T1S" set for the following shift (step S402'). With respect to the predetermined time "T1S" at step S402', it is set to a shorter period of time than the predetermined time "T1S" set at the normal up-shift. This is for reducing the delay time at the intermediate speed stage. And afterwards, the control proceed to the same pre-changeover holding control as the normal shift (step S403). In the pre-changeover holding control, the hydraulic pressure is maintained at the hydraulic pressure "TR2" according to the input torque until the piston stroke of the engagement side frictional element is finished, and the speed change (or current speed stage) is kept at or by the side of disengagement side frictional element. Here, in the case of the normal shift, upon detection of ON of the hydraulic pressure switch, the control proceeds to the next gear changeover control. However, at the secondary shift of the sequential shift, it is forbidden to use ON of the hydraulic pressure switch as the trigger. And then, upon judging that the predetermined time "T2" elapses, the control proceeds to the next gear changeover control (step S404').

The reason why it is forbidden to use ON of the hydraulic pressure switch as the trigger is because the hydraulic pressure switch is already ON state, and the prevention against going out of synchronization with a gear changeover control start timing of the engagement side frictional element is taken. Then, as described above, by equalizing both count-times for the engagement and disengagement side frictional elements, the controls for the engagement and disengagement side frictional elements can proceed to the gear changeover control at the same time. And after that, the control is executed in the same manner as the normal shift. That is, the hydraulic pressure is gradually lowered with the predetermined gradient set according to the input torque and the vehicle speed (the inertia phase control), and when the gear ratio reaches the predetermined gear ratio, the hydraulic pressure is lowered toward 0 (zero), and then the speed change is terminated.

And by executing the above select-high control, the pressure command value for the 3-5 reverse clutch 3-5R/C becomes the characteristic indicated by thick line in FIG. 12C. And thus, the two continuous shifts can be achieved smoothly, and it is possible to prevent or suppress the occurrence of the undesired shift shock, at the up-shift too, same as the case of the downshift.

Figure 13:
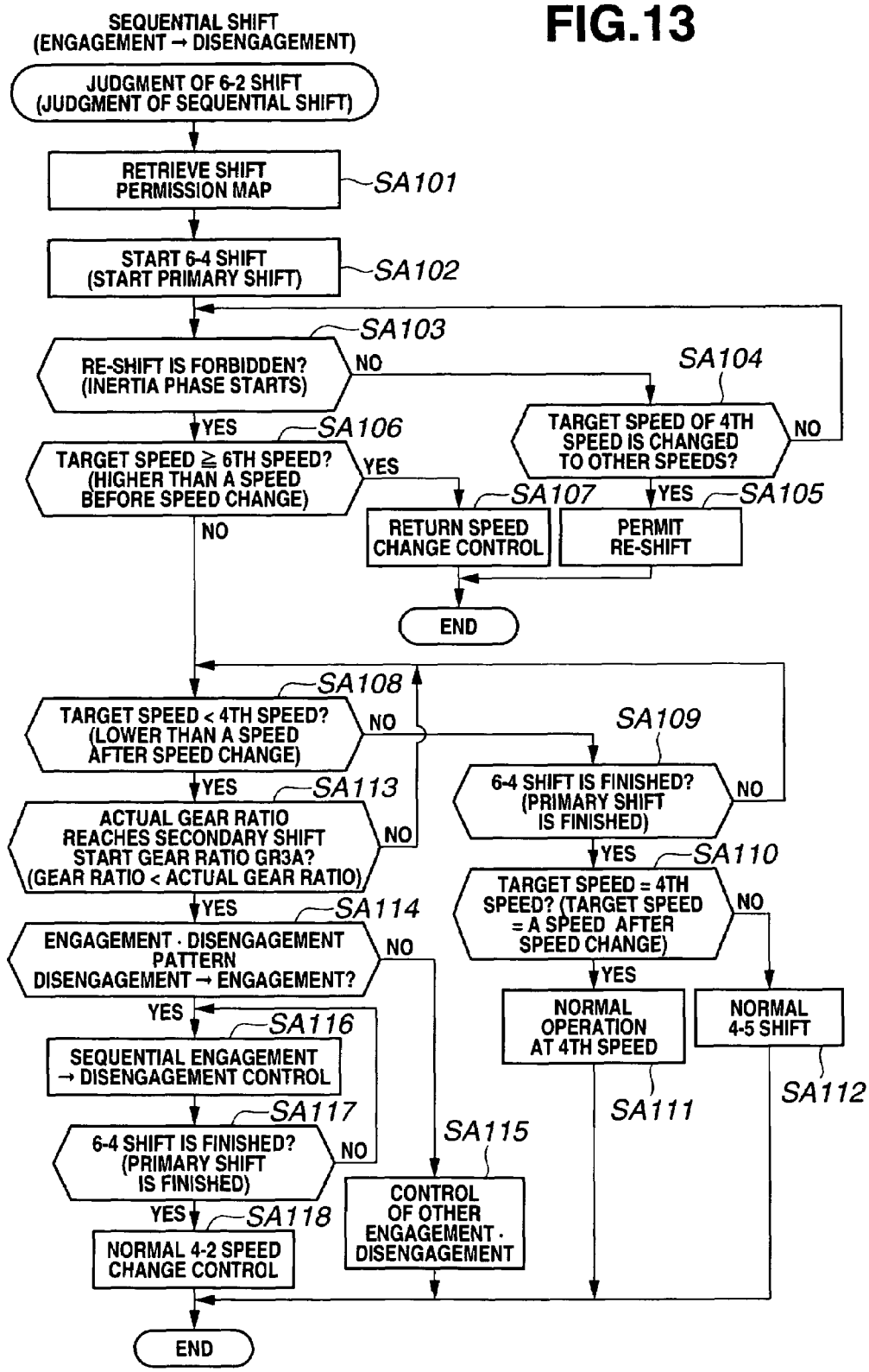
FIG. 13 is an example of flow chart for explanation of operation steps in a case of a downshift of $6^{th} \rightarrow 4^{th} \rightarrow 2^{nd}$ speed in the control apparatus.

As explained above, the control apparatus of automatic transmission of the present invention is configured so that the above-mentioned control can be achieved. In the following, the operation will be explained with reference to flow charts in FIGS. 13 and 14. FIGS. 13 and 14 are the flow charts of a case where the skip shift (sequential shift) from the first speed stage ($6^{th}$ speed) to the third speed stage ($2^{nd}$ speed) is carried out. When the sequential shift from $6^{th}$ speed to $2^{nd}$ speed is judged (that is, when the target speed is changed from $6^{th}$ speed to $2^{nd}$ speed), the control is initiated in accordance with the flow chart.

Firstly, when a judgment of a sequential shift from $6^{th}$ speed to $4^{th}$ speed is made, the control unit retrieves data stored in a shift permission map (or speed change permission map, not shown) (step SA101). In this shift permission map, a speed that is able to shift or change from a current speed by one-time shift control is stored. In this embodiment, only current speed±1 speed and one skip downshift are permitted. Thus, in this case, one skip shift (primary shift or previous shift) from $6^{th}$ speed (the first speed stage) to $4^{th}$ speed (the second speed stage) is first permitted.

Then, by receiving this permission of the previous shift (or subject to this permission of the previous shift), the primary shift 6→4 is initiated (step SA102). Next, after the initiation of the primary shift, a check is made to determine whether or not re-shift (or re-speed-change) is forbidden (step SA103). Here, the re-shift indicates a shift that shifts toward a newly changed target speed other than $4^{th}$ speed (the second speed stage) after the target speed is changed from $4^{th}$ speed to the newly changed target speed other than $4^{th}$ speed. With respect to the prohibition of the re-shift, more specifically, a check is made to determine whether or not the inertia phase is started at the primary shift. If the inertia phase already starts (that is, after the start of the inertia phase), the prohibition of the re-shift is judged. While, if the inertia phase does not start yet (that is, before the start of the inertia phase), it is judged that the re-shift is available.

In the case where the re-shift is available, next, a check is made to determine whether or not the target speed is changed to a speed other than $4^{th}$ speed (step SA104). If the target speed is changed to the speed other than $4^{th}$ speed, the re-shift is permitted, and the shift control for the new target speed (namely, the re-shift) is executed (step SA105). While, if the target speed is not changed, the routine returns to step SA103. On the other hand, at step SA103, in the case where the prohibition of the re-shift is judged, a check is made to determine whether or not the target speed is higher than or equal to $6^{th}$ speed of the current speed (that is, higher speed) (step SA106). If the target speed is higher than the current speed, this means that the shift (speed change) is changed from the downshift to the up-shift, and a return speed change (or shift) control is executed (step SA107). Here, the return speed change control is a control that cancels the downshift and switches over from the downshift to the up-shift. However, this return speed change control is well known, and is not much related to the present invention. Its explanation will therefore be omitted.

At step SA106, if the answer is "NO", a check is made to determine whether or not the target speed is lower than $4^{th}$ speed (step SA108). If "NO" at step SA108, this means that the target speed is higher than or equal to $4^{th}$ speed and is lower than $6^{th}$ speed ($4^{th}$ speed≦the target speed<$6^{th}$ speed), and the finish of the shift to $4^{th}$ speed is judged (step SA109). And after this judgment, a check is made to determine whether the target speed is $4^{th}$ speed or $5^{th}$ speed (step SA110), if the target speed is $4^{th}$ speed, normal operation at $4^{th}$ speed is made as it is (step SA111). While, if the target speed is $5^{th}$ speed, the normal shift control from $4^{th}$ speed to $5^{th}$ speed is carried out (step SA112).

On the other hand, the answer is "YES" at step SA108, this means that $2^{nd}$ speed (the third speed stage) is maintained as the final target speed, and in this case, a check is made to determine whether or not the actual gear ratio is lower than the secondary shift start gear ratio (the earlier starting gear ratio) "GR3A", that is, whether or not the actual gear ratio reaches the secondary shift start gear ratio "GR3A" (step SA113). If the actual gear ratio does not reach the secondary shift start gear ratio "GR3A", the secondary shift is forbidden until the actual gear ratio reaches the secondary shift start gear ratio "GR3A".

While, when the actual gear ratio reaches the secondary shift start gear ratio "GR3A", the prohibition of the secondary shift is released, and a check is made to determine whether or not the third speed stage is a speed having the frictional element that is engaged and disengaged (engagement→disengagement) at the primary shift and also is disengaged and engaged (disengagement→engagement) at the secondary shift (step SA114). Here, regarding the check at this step SA114, on the basis of the table of engagement state of frictional element in FIG. 2, a combination of shift (that is, the shift pattern) in which a frictional element is "engagement→disengagement→engagement" is previously stored. And by retrieving the shift patterns and comparing an actual shift pattern with the above previously stored shift patterns, the check (judgment) is made at step SA114.

Then, if such frictional element does not occur, that is, if the third speed stage is $3^{rd}$ speed, the answer becomes "NO". And then, the routine proceeds to step SA115, and the normal control of engagement-disengagement of the frictional element is executed. While, if such frictional element (engagement→disengagement at the primary shift, and disengagement→engagement at the secondary shift) occurs, that is, if the third speed stage is $2^{nd}$ speed, the shift control by third shift control section 405 is carried out (step SA116). A sub-routine of step SA116 will be explained later.

And, when the completion of the shift control (the primary shift) from $6^{th}$ speed to $4^{th}$ speed is judged (step SA117), the normal shift control (the secondary shift) from $4^{th}$ speed to $2^{nd}$ speed is carried out (step SA118). By this flow chart, pressure command value for each frictional element can be adjusted by third shift control section 405 until the primary shift is completed, and it is possible to optimize the control.

Next, the sub-routine of step SA116 will be explained with reference to FIG. 14. This sub-routine is a sub-routine that starts when the secondary shift of the skip shift (the sequential shift) is judged. The torque share ratio correction for the disengagement side frictional element (in this case, the high clutch H/C) at secondary shift is first made as a preparation for removing pressure (step SB201). And also, the time "T1S" required to remove the hydraulic pressure (a pressure removal preparation time "T1S") is set (step SB202). Then, the pressure command value is gradually reduced to the previously mentioned third pressure command value.

Further, at such sequential shift, it is forbidden to use ON of the hydraulic pressure switch of the engagement side frictional element at the secondary shift as the trigger (step SB203). When the secondary shift is initiated, the select-high control is executed, in which the pressure command value for the 2-6 brake 2-6/B at the primary shift and the pressure command value at the secondary shift are compared with each other, and the greater pressure command value is always selected and is output as the final pressure command value for the 2-6 brake 2-6/B (step SB204).

Next, at step SB205, the actual gear ratio is compared with the first frictional element pressure release gear ratio "GR3B". If it is judged that the actual gear ratio reaches the first frictional element pressure release gear ratio "GR3B", a removal timing earlier starting control is executed, in which the a hydraulic pressure release timing of the disengagement side frictional element at the primary shift (the previous shift) is advanced with respect to the initial or original timing after the start of the secondary shift (step SB206). Further, the removal gradient of the hydraulic pressure is changed (or corrected) to a steep gradient (step SB207). Here, with respect to the above steps S205 to S207, they are executed at only downshift. While, in the case of the up-shift, the routine proceeds from step SB204 to step SB208.

After the correction of the removal gradient, a check is made to determine whether or not the primary shift is completed (step SB208). If the completion of the primary shift is judged, 6→4 shift of this sequential shift is terminated (step SB209). That is, at step SB208, the above select-high control is finished. And after that, the normal 4-2 shift, previously programmed in A/T control unit 40, is executed (step SB210).

As explained above, according to the control apparatus of automatic transmission of the present invention, even at the sequential shift, the shift control is basically executed by using the control program (control data) previously stored in first and second shift control sections 403 and 404. It is therefore possible to suppress or minimize the increase of the speed change data. Further, regarding the primary and secondary shifts, the secondary shift is initiated before the end of the primary shift. Thus, the hydraulic pressure of the first frictional element is not greatly lowered, and then the time period required to reach the final target speed can be shortened. That is to say, after the overlap timing of the shift, the hydraulic pressure of the first frictional element is set to the greater pressure command value that is selected by the select-high control. And by this select-high control, the hydraulic pressure of the first frictional element can continuously vary or change, and thereby carrying out the two continuous shifts speedily and smoothly and also suppressing the occurrence of the shift shock.

Furthermore, by initiating the secondary shift before the end of the primary shift, the delay of the gear ratio at the second speed stage can be prevented or shortened, and thereby shortening the time period required to reach the third speed stage of the final target speed. Moreover, in the case of the normal downshift, with respect to the hydraulic pressure of the first frictional element at the primary shift, its release timing (removal timing) that starts to lower the hydraulic pressure toward 0 (zero) pressure at the overlap of the primary and secondary shifts is set to the relatively earlier timing for smoothing the torque fluctuations at the end of the speed change. And also, it is set so that the hydraulic pressure is lowered with relatively slow gradient. Because of this, even if the command of the initiation of the secondary shift is issued during the primary shift, there is a possibility that the interlock and the delay at the second speed stage ($4^{th}$ speed) will occur due to an excess pressure. However, in this embodiment, the release timing of the hydraulic pressure is advanced, and also the hydraulic pressure is lowered with the steep gradient, as compared with the case of the independent primary shift. Therefore, the interlock and the delay of the gear ratio can be prevented.

On the other hand, at the up-shift in this embodiment, it is forbidden to release the hydraulic pressure of the first frictional element to 0 (zero) before the end of the primary shift. And the pressure command value for the first frictional element is corrected so that the hydraulic pressure is kept at the hydraulic pressure (the release pressure) equivalent to the completion of the piston stroke. Thus, the delay of the gear ratio at the second speed stage can be avoided. That is to say, if the hydraulic pressure of the first frictional element is lowered to 0 (zero) pressure upon judging the completion of the piston stroke of the second frictional element in the same manner as the normal primary shift, the hydraulic pressure completely becomes 0 (zero) before the start of the secondary shift and therefore the piston of the first frictional element has to be moved up or forwards again at the start of the secondary shift. As a result, this delays the actual start of the secondary shift, and the delay occurs at the second speed stage, and thereby might make the driver feel the awkward switching over from the primary shift to secondary shift. However, in this embodiment, by keeping the hydraulic pressure of the first frictional element at the release pressure, it is possible to prevent such delay of the gear ratio.

In addition, at the above sequential shift, since the pre-charge control at the start of the secondary shift is forbidden, the actual hydraulic pressure of the first frictional element can continuously vary or change between the disengagement and engagement without discontinuous change, and the shift shock can be prevented. That is, in the case of the normal shift, even though the hydraulic pressure of the first frictional element, which is released at the primary shift, is low pressure, the piston is still moved up or forwards. And if the pre-charge is carried out at the secondary shift under this condition, the pressure command value for the first frictional element at the secondary shift becomes too high, and the shift shock occurs due to abrupt engagement of the first frictional element. However, by forbidding the pre-charge, since the abrupt engagement of the first frictional element can be prevented or suppressed, the shift shock can be avoided.

Further, at the sequential shift, information from the hydraulic pressure switch (the piston stroke determining or judging unit or means) is cancelled or disregarded at the secondary shift. That is, it is forbidden to use ON of the hydraulic pressure switch as the trigger. Thus, the shift shock can be prevented. In other wards, in a case where the start timing of the gear changeover control for the hydraulic pressure of the first frictional element is determined or judged by the result of the hydraulic pressure switch in the same way as the normal secondary shift, regarding the first frictional element that is released during the primary shift, since its state of the piston stroke is completed at the start of the secondary shift, an output of the command for the switching over to the gear changeover control and the initiation of the secondary shift take place at the same time. And therefore, there is a possibility that the shift shock will occur. Thus, by disregarding the information of the hydraulic pressure switch and initiating the gear changeover control when the predetermined time ("T1" for the engagement side frictional element, "T1S" for the disengagement side frictional element) elapses, it is possible to prevent the shift shock.

And furthermore, in the case where the share ratio of the third frictional element at the first speed stage is greater than that at the second speed stage (the share ratio at the second speed stage is smaller than that at the first speed stage), the second pressure command value of the third frictional element is corrected on the basis of the ratio between the share ratios at the first and second speed stages. It is therefore possible to suppress the flare-up of the gear ratio, caused by the clutch capacity shortage. Moreover, the hydraulic pressure of the first frictional element is increased with the increase of the input torque, and this takes a long time to release the hydraulic pressure. And then, there is a possibility that the interlock and delay at the intermediate speed stage will occur. However, by correcting the gradient of pressure reduction (the first predetermined slope or gradient or the removal gradient) of the first frictional element according to the input torque, the delay at the intermediate speed stage, the interlock and the flare-up etc. can be suppressed.

With respect to the second predetermined gear ratio in the above description, the second predetermined gear ratio (or a parameter corresponding to the second predetermined gear ratio) is more greatly corrected to a previous gear ratio (or a condition) set before the start of the primary shift (in the case of downshift; corrected to the gear ratio of higher speed, in the case of up-shift; corrected to the gear ratio of lower speed) with the increase of the vehicle speed and also with the increase of the input torque. Thus, it is possible to properly control the shift according to the vehicle speed and input torque, and the delay at the intermediate speed stage and the interlock can certainly be prevented regardless of the vehicle operating condition.

In the control of the transmission, in a case where data of second shift control section 404 is used, it is required that the start timing of the secondary shift during the execution of the primary shift control should be set earlier with consideration given to the response delay of actual hydraulic pressure with respect to the pressure command value. And the response delay of actual hydraulic pressure is constant unless the viscosity of working or hydraulic fluid changes. Thus, with usage of a constant (or fixed) gear ratio that is positioned before the inertia phase end gear ratio "GR3", it could be possible to cancel or compensate for the time of the response delay of the actual hydraulic pressure by initiating the secondary shift when the gear ratio has reached this constant gear ratio. However, since the rate of change of the gear ratio varies or changes depend on the torque and vehicle speed, a time required to reach the inertia phase end gear ratio "GR3" changes depend on the torque and vehicle speed. Therefore, if the secondary shift is initiated upon reaching the constant gear ratio, there is a possibility that the delay at the intermediate speed stage, the interlock and the flare-up will occur depend on the torque and vehicle speed. However, in this embodiment, the secondary shift start gear ratio "GR3A" is set so that the lower the vehicle speed, the greater the difference between the inertia phase end gear ratio "GR3" and the secondary shift start gear ratio "GR3A". Further, the secondary shift start gear ratio "GR3A" is corrected so that the greater the input torque that is input to the transmission 1, the greater the above difference. Consequently, the start timing of the secondary shift can be corrected to a proper or appropriate timing, and the delay at the intermediate speed stage, the interlock and the flare-up can be prevented.

This application is based on a prior Japanese Patent Application No. 2005-372877 filed on Dec. 26, 2005. The entire contents of this Japanese Patent Application No. 2005-372877 are hereby incorporated by reference.

Although the invention has been described above by reference to certain embodiments of the invention, the invention is not limited to the embodiments described above. Modifications and variations of the embodiments described above will occur to those skilled in the art in light of the above teachings. For instance, the control and configuration of the present invention can be used for a skeleton of six speed automatic transmission, disclosed in Japanese Patent Provisional Publication No. 2003-106439, and also for an automatic transmission having seven speed or more. The scope of the invention is defined with reference to the following claims.

What is claimed is:

1. A control apparatus of an automatic transmission comprising:
a first frictional element that is engaged at a first speed stage and is released at a second speed stage achieved by a primary shift and further is engaged at a third speed stage achieved by a secondary shift;
a second frictional element that is released at the first speed stage and is engaged at the second speed stage and further is engaged at the third speed stage;
a third frictional element that is engaged at the first speed stage and is engaged at the second speed stage and further is released at the third speed stage;
a first shift control section that issues a command of hydraulic pressure for the first frictional element to be released, and issues a command of hydraulic pressure for the second frictional element to be engaged, at the time of the primary shift;
a second shift control section that issues a command of hydraulic pressure for the first frictional element to be engaged, and issues a command of hydraulic pressure for the third frictional element to be released, at the time of the secondary shift;
a judging section that judges a shift from the first speed stage to the third speed stage based on an operation condition of a vehicle; and
a third shift control section that initiates the primary shift when the shift is judged by the judging section, and initiates the secondary shift while carrying out the primary shift when a gear ratio reaches a first predetermined gear ratio set before a gear ratio where an inertia phase of the primary shift is ended, or when a parameter reaches a parameter corresponding to the first predetermined gear ratio, and
the third shift control section comparing two pressure command values for the first frictional element, respectively issued by the first and second shift control sections, and selecting a greater pressure command value, and outputting the greater pressure command value to the first frictional element, upon the initiation of the secondary shift.

2. The control apparatus of the automatic transmission as claimed in claim 1, wherein:
the first and second shift control sections control a downshift,
the first shift control section outputs the pressure command value for lowering the hydraulic pressure of the first frictional element to zero pressure with a first predetermined gradient when the gear ratio reaches a second predetermined gear ratio or when the parameter reaches a parameter corresponding to the second predetermined gear ratio, and
the third shift control section has an end timing correction section that corrects the pressure command value to advance a timing of the pressure release to zero pressure of the first frictional element, executed by the first shift control section.

3. The control apparatus of the automatic transmission as claimed in claim 1, wherein:
the first and second shift control sections control an upshift,
the first shift control section outputs the pressure command value for releasing the hydraulic pressure of the first frictional element to zero pressure with a third predetermined gradient before an end of the primary shift on the basis of the gear ratio or the parameter corresponding to the gear ratio, and
the third shift control section has an end timing correction section that forbids the pressure release to zero pressure of the first frictional element and corrects the pressure command value to keep the hydraulic pressure of the first frictional element at a hydraulic pressure equivalent to completion of a piston stroke of the first frictional element.

4. The control apparatus of the automatic transmission as claimed in claim 1, wherein:
the second shift control section executes a pre-charge control in which a high pressure command value is output once at the time of the engagement of the first frictional element and afterwards a low hydraulic pressure is maintained for advancing a piston stroke, and
the third shift control section forbids the pre-charge control executed by the second shift control section.

5. The control apparatus of the automatic transmission as claimed in claim 1, further comprising:
a piston stroke judging unit that judges a completion of piston stroke of the first frictional element,
wherein:
the second shift control section is configured to change the pressure command value on the basis of the result of judgment by the piston stroke judging unit, and
the third shift control section forbids the change of the pressure command value, executed by the second shift control section based on the judgment result by the piston stroke judging unit.

6. The control apparatus of the automatic transmission as claimed in claim 1, wherein:
the second shift control section outputs the pressure command value for lowering the hydraulic pressure of the third frictional element in steps to a second hydraulic pressure value upon the initiation of the secondary shift,
when an input torque is defined as 1, each share ratio is defined as a ratio of torque which the each frictional element receives at the each speed stage, and
in a case where the share ratio of the third frictional element at the second speed stage is smaller than that at the first speed stage, the third shift control section corrects the second hydraulic pressure value on the basis of a ratio between the share ratios at the first and second speed stages.

7. The control apparatus of the automatic transmission as claimed in claim 2, wherein:
the end timing correction section corrects the first predetermined gradient according to a vehicle speed and an input torque when the gear ratio reaches the second predetermined gear ratio or when the parameter reaches the parameter corresponding to the second predetermined gear ratio, and the correction of the first predetermined gradient is made so that the higher the vehicle speed or the greater the input torque, the greater the first predetermined gradient is.

8. The control apparatus of the automatic transmission as claimed in claim 2, wherein:
the end timing correction section corrects the second predetermined gear ratio or the parameter corresponding to the second predetermined gear ratio according to a vehicle speed and an input torque, and the correction is made so that the higher the vehicle speed or the greater the input torque, the more greatly the second predetermined gear ratio or the parameter corresponding to the second predetermined gear ratio is corrected toward a condition set before the start of the primary shift.

9. The control apparatus of the automatic transmission as claimed in claim 1, wherein:
the third shift control section has a start timing correction section that, on the basis of a vehicle speed and an input torque, corrects the first predetermined gear ratio or the parameter corresponding to the first predetermined gear ratio where the secondary shift is initiated, and
the start timing correction section executes the correction so that the lower the vehicle speed, the greater the difference between the first predetermined gear ratio or the parameter corresponding to the first predetermined gear ratio and the gear ratio or a parameter corresponding to the gear ratio where the inertia phase is ended is, and also the greater the input torque that is input to the transmission, the greater the difference is.

10. A control apparatus of an automatic transmission comprising:
a first frictional element that is engaged at a first speed stage and is released at a second speed stage achieved by a primary shift and further is engaged at a third speed stage achieved by a secondary shift;
a second frictional element that is released at the first speed stage and is engaged at the second speed stage and further is engaged at the third speed stage;
a third frictional element that is engaged at the first speed stage and is engaged at the second speed stage and further is released at the third speed stage;
the first, second and third frictional elements being configured to respectively receive a pressure command value and to be engaged by a high pressure command value and to be released by a low pressure command value;
a shift control section that outputs the pressure command value to the first, second and third frictional elements for engagement and release thereof, and upon judging a shift from the first speed stage to the third speed stage based on an operation condition of a vehicle, initiates the secondary shift before the primary shift is finished; and
the shift control section comparing two pressure command values of the first frictional element for the primary shift and for the secondary shift, and selecting a greater pressure command value, and outputting the greater pressure command value to the first frictional element, upon the initiation of the secondary shift before the end of the primary shift.

11. A control apparatus of an automatic transmission comprising:
a first frictional element that is engaged at a first speed stage and is released at a second speed stage achieved by a primary shift and further is engaged at a third speed stage achieved by a secondary shift;
a second frictional element that is released at the first speed stage and is engaged at the second speed stage and further is engaged at the third speed stage;
a third frictional element that is engaged at the first speed stage and is engaged at the second speed stage and further is released at the third speed stage;
first control means for issuing a command of hydraulic pressure for the first frictional element to be released, and issuing a command of hydraulic pressure for the second frictional element to be engaged, at the time of the primary shift;
second control means for issuing a command of hydraulic pressure for the first frictional element to be engaged, and issuing a command of hydraulic pressure for the third frictional element to be released, at the time of the secondary shift;
judging means for judging a shift from the first speed stage to the third speed stage based on an operation condition of a vehicle; and
third control means for initiating the primary shift when the shift is judged by the judging means, and initiating the secondary shift while carrying out the primary shift when a gear ratio reaches a first predetermined gear ratio set before a gear ratio where an inertia phase of the primary shift is ended or when a parameter reaches a parameter corresponding to the first predetermined gear ratio, and the third control means comparing two pressure command values for the first frictional element, respectively issued by the first and second control means, and selecting a greater pressure command value, and outputting the greater pressure command value to the first frictional element, upon the initiation of the secondary shift.

12. A method for controlling hydraulic pressure for a computer-controlled automatic transmission having a first frictional element that is engaged at a first speed stage and released at a second speed stage achieved by a primary shift and further engaged at a third speed stage achieved by a secondary shift, a second frictional element that is released at the first speed stage and engaged at the second speed stage and further engaged at the third speed stage, and a third frictional element that is engaged at the first speed stage and engaged at the second speed stage and further released at the third speed stage, wherein a shift control section is provided for outputting each pressure command value to the first, second and third frictional elements for engagement and release thereof, and initiating the primary and secondary shifts at their respective proper timings, the method comprising:

upon the initiation of the secondary shift before an end of the primary shift by the shift control section, comparing two pressure command values of the first frictional element for the primary shift and for the secondary shift;

selecting a greater pressure command value; and outputting the greater pressure command value to the first frictional element.

* * * * *